United States Patent
Adams

(10) Patent No.: US 9,874,710 B2
(45) Date of Patent: Jan. 23, 2018

(54) SWING ARM ASSEMBLIES FOR UTILITY VAULTS

(71) Applicant: Hubbell Incorporated, Shelton, CT (US)

(72) Inventor: Jonathan Oral Adams, Columbia, MO (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 15/451,577

(22) Filed: Mar. 7, 2017

(65) Prior Publication Data

US 2017/0176702 A1 Jun. 22, 2017

Related U.S. Application Data

(62) Division of application No. 14/512,733, filed on Oct. 13, 2014, now Pat. No. 9,612,415.

(60) Provisional application No. 61/910,947, filed on Dec. 2, 2013, provisional application No. 61/890,553, filed on Oct. 14, 2013.

(51) Int. Cl.
G02B 6/50 (2006.01)
G02B 6/44 (2006.01)
H02G 9/10 (2006.01)
F16M 13/02 (2006.01)

(52) U.S. Cl.
CPC .............. *G02B 6/445* (2013.01); *F16M 13/02* (2013.01); *G02B 6/504* (2013.01); *H02G 9/10* (2013.01)

(58) Field of Classification Search
CPC ........ G02B 6/4442; G02B 6/504; H02G 9/10; H02G 15/10
See application file for complete search history.

(56) References Cited

U.S. PATENT DOCUMENTS

| | | | |
|---|---|---|---|
| 4,659,125 A | 4/1987 | Chuan | |
| 5,299,098 A * | 3/1994 | Schussler | H02G 3/16 361/725 |
| 5,947,834 A | 9/1999 | Hope | |
| 6,272,853 B1 | 8/2001 | Broechmann | |
| 7,267,314 B1 * | 9/2007 | Erickson | F16M 11/10 108/144.11 |
| 8,847,070 B2 * | 9/2014 | Burke | G02B 6/4451 174/37 |
| 9,612,415 B2 * | 4/2017 | Adams | G02B 6/4442 |
| 2006/0082079 A1 * | 4/2006 | Eichhorn | B60S 9/12 280/6.155 |
| 2009/0175588 A1 | 7/2009 | Brandt | |
| 2013/0255446 A1 * | 10/2013 | Taggart | E21B 19/161 81/57.11 |

OTHER PUBLICATIONS

Assembly Instructions for Coming's Swing Arm Assembly for Sealed Local Convergence Point Enclosure date Dec. 2012.

* cited by examiner

*Primary Examiner* — Daniel Petkovsek
(74) *Attorney, Agent, or Firm* — Ohlandt, Greeley, Ruggiero & Perle, L.L.P.

(57) ABSTRACT

Swing arm assemblies for providing access to wiring enclosures are described that provide convenient one handed operation and the ability to temporarily fix the enclosure at a telescoped height and optionally in a rotated position.

16 Claims, 30 Drawing Sheets

SWING ARM ASSEMBLIES FOR UTILITY VAULTS

CROSS REFERENCE TO RELATED APPLICATIONS

This application is a divisional of U.S. application Ser. No. 14/512,733 filed on Oct. 13, 2014, which issued as U.S. Pat. No. 9,612,415 on Apr. 4, 2017, which claims the benefit of U.S. Provisional Application Ser. No. 61/890,553 filed Oct. 14, 2013 and claims the benefit of U.S. Provisional Application Ser. No. 61/910,947 filed Dec. 2, 2013, the entire contents of all of which are incorporated herein in their entirety by reference thereto.

BACKGROUND

1. Field of the Disclosure

The present application is related to swing arm assemblies that provide access to components within utility vaults. More specifically, the present application is related to swing arm assemblies provide access to cable assemblies within utility vaults by allowing movement of the cable assemblies between a storage position in the vault and a service position outside of the vault.

2. Description of Related Art

Many utilities such as, but not limited to telecommunications cables, are run completely or partially underground from a utility station to a neighborhood and then on to individual homes. For example, telecommunications cables may include fiber or copper cables that are run underground in a neighborhood. At certain junctions, such as a junction leading to a neighborhood or subscriber home, those cables may enter a vault. Such a vault may be fully buried, partially buried or fully exposed above the ground such as on cement, gravel, earth or other foundation.

Accordingly, certain vaults are situated in a low position relative to a standing or seated position of a technician who would like to work on the contents of the vault. Therefore, the contents may be located in an inconvenient location. In certain situations, the contents of the vault may include a junction box or wiring enclosure having incoming and outgoing cables with some slack cables inside the vault. It has recently been proposed for the enclosure to be mounted on a swing arm assembly used for swinging the enclosure up and out of the vault. Additionally, the swing arm assembly may include a telescoping portion to allow higher access to the enclosure. Unfortunately, the prior art swing arm assemblies have proven difficult to assemble, use, and store.

Accordingly, it has been determined by the present disclosure that there is a continuing need for swing arm assemblies that overcome, alleviate, and/or mitigate one or more of the aforementioned and other deleterious effects of prior art assemblies.

SUMMARY

The present application describes illustrative embodiments of systems and methods of making and using systems for providing access to an assembly from a utility vault. In certain illustrative embodiments, the systems and methods are useful in systems including those for providing movable access for a wiring assembly into a service position from an open vault.

In one illustrative example, a swing arm assembly includes a latch that provides hands-free operation so that a technician has better access to manipulate the enclosure and the swing arm assembly.

In another illustrative embodiment, a swing arm assembly includes a portion connected to an enclosure that is rotatable around an axis such as including the ability to rotate the enclosure at least 45-90 or more degrees.

In another illustrative embodiment, a swing arm assembly includes a portion connected to an enclosure that is rotatable around an axis such as including the ability to rotate and to be temporarily fixed in a service position.

In another illustrative embodiment, a swing arm assembly includes a tubular portion connected to an enclosure that is rotatable around an axis and that provides telescoping access to the enclosure such as for extending the enclosure laterally or for raising the enclosure to a higher position. In another illustrative embodiment, includes a portion connected to an enclosure that is rotatable around an axis such as including the ability to rotate and to be temporarily fixed in a service position and fixed to prevent raising the enclosure to an even higher position including preventing the tubular portion connected to the enclosure from being lifted off of a base telescoping tubular portion.

In another illustrative example, a swing arm assembly includes a latch that provides hands-free operation so that a technician has better access to manipulate the enclosure and the swing arm assembly, a tubular portion connected to an enclosure that is rotatable around an axis such as including the ability to rotate the enclosure at least 45-90 or more degrees, wherein the tubular, rotatable portion may be temporarily fixed in a service position using one-handed operation, and wherein the tubular, rotatable portion connected to the enclosure provides telescoping access to the enclosure such as for extending the enclosure laterally or for raising the enclosure to a higher position.

A swing arm assembly is provided that includes a mounting bracket, an inner tube, an outer tube, and a plunger. The inner tube is connected to the mounting bracket and has a slot remote from the mounting bracket. The outer tube is positioned over the inner tube for telescoping movement between a lower position and an upper position and for rotational movement from the upper position to a service position. The plunger is biased through the outer tube towards the inner tube and has a distal end that is received in the slot when the outer tube is telescopically moved with respect to the inner tube to the upper position to secure the outer tube in the upper position. The distal end slides in the slot when the outer tube is rotationally moved with respect to the inner tube between the upper and service positions.

In other embodiments alone or with one or more of the aforementioned or later mentioned embodiments, the slot further includes a locking portion running in a longitudinal direction at the service position, the distal end being received in the locking portion to secure the outer tube in the service position.

In other embodiments alone or with one or more of the aforementioned or later mentioned embodiments, the swing arm assembly further includes a wiring enclosure mounted to the outer tube.

In other embodiments alone or with one or more of the aforementioned or later mentioned embodiments, the slot is formed through the inner tube and has a remaining portion of the inner tube. The slot can have a length in a circumferential direction sufficient to allow for rotational movement of up to 180 degrees.

In other embodiments alone or with one or more of the aforementioned or later mentioned embodiments, the slot is configured to allow at least 360 degrees of rotation. In some embodiments, the slot is a recess defined in an outer diameter of the inner tube. In other embodiments, the slot includes a first side defined by an upper edge of the inner tube and a second side defined by a cap secured in an inner diameter of the inner tube.

In other embodiments alone or with one or more of the aforementioned or later mentioned embodiments, the inner tube is connected to the mounting bracket for pivoting movement between a closed position and the lower position. In some embodiments, the mounting bracket is configured to form a mounting angle relative to a line perpendicular to a vault enclosure side wall to which it is mounted of from 10 and 30 degrees. In other embodiments, the mounting bracket can include a latch to releasably secure the inner tube in the lower position.

A swing arm assembly is also provided that includes a mounting bracket, an inner tube, and an outer tube. The mounting bracket is mountable on vault enclosure side wall and forms a mounting angle relative to a line perpendicular to the vault enclosure side wall of from 10 and 30 degrees. The inner tube is connected to the mounting bracket for pivoting movement between a closed position and a lower position. The outer tube is positioned over the inner tube for telescoping movement between the lower position and an upper position. In some embodiments, the outer tube further positioned over the inner tube for rotational movement from the upper position to a service position.

In other embodiments alone or with one or more of the aforementioned or later mentioned embodiments, the swing arm assembly can include a wiring enclosure mounted to the outer tube.

In other embodiments alone or with one or more of the aforementioned or later mentioned embodiments, the swing arm assembly can include a plunger biased through the outer tube towards the inner tube and a slot in the inner tube remote from the mounting bracket. Here, the plunger has a distal end that is received in the slot when the outer tube is telescopically moved with respect to the inner tube to the upper position to secure the outer tube in the upper position. The distal end sliding in the slot when the outer tube is rotationally moved with respect to the inner tube between the upper and service positions.

In other embodiments alone or with one or more of the aforementioned or later mentioned embodiments, the slot is configured to allow at least 360 degrees of rotation.

A vault assembly is also provided. The vault assembly includes a utility vault for receipt of telecommunication cables, a mounting bracket, an inner tube, and outer tube. The mounting bracket mounted on a wall of the utility vault. The inner tube connected to the mounting bracket for pivoting movement between a closed position and a lower position. The mounting bracket forms a mounting angle relative to a line perpendicular to the wall of from 10 and 30 degrees. The outer tube is positioned over the inner tube for telescoping movement between the lower position and an upper position and for rotational movement from the upper position to a service position.

In some embodiments, the vault assembly further includes a wiring enclosure mounted to the outer tube.

In other embodiments alone or with one or more of the aforementioned or later mentioned embodiments, the vault assembly further includes a plunger biased through the outer tube towards the inner tube and a slot in the inner tube remote from the mounting bracket, the plunger having a distal end that is received in the slot when the outer tube is telescopically moved with respect to the inner tube to the upper position to secure the outer tube in the upper position, the distal end sliding in the slot when the outer tube is rotationally moved with respect to the inner tube between the upper and service positions. The slot can be configured to allow at least 360 degrees of rotation.

BRIEF DESCRIPTION OF THE DRAWINGS

The accompanying drawings illustrate presently preferred embodiments of the disclosure, and together with the general description given above and the detailed description given below, serve to explain the principles of the disclosure. As shown throughout the drawings, like reference numerals designate like or corresponding parts.

FIG. 15 is a perspective view of an inner tube for a swing arm assembly according to an illustrative embodiment of the present application.

DETAILED DESCRIPTION

Figure 1:
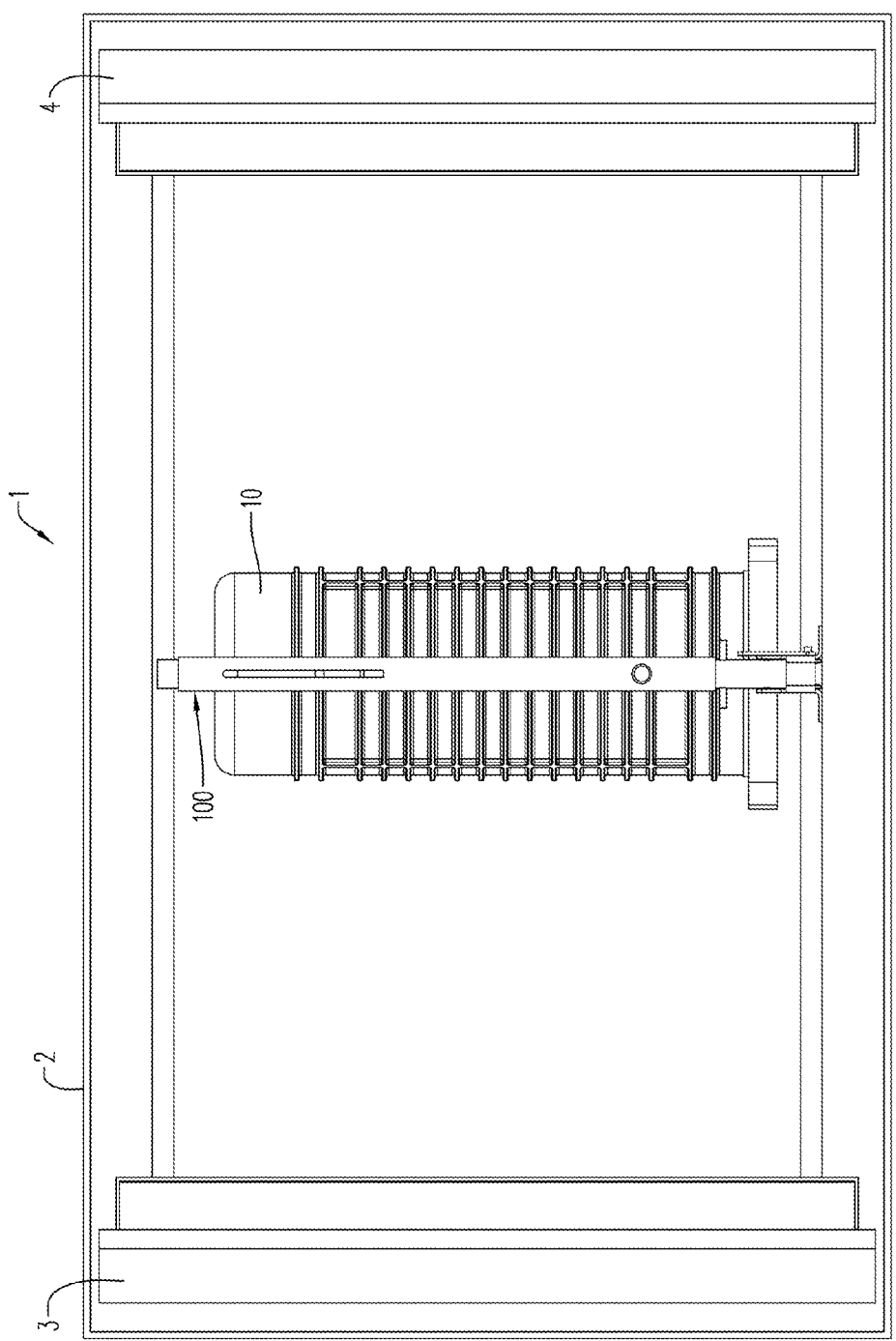
FIG. 1 is a top plan view of a swing arm assembly having a mounted enclosure with the swing arm assembly mounted to a vault and with the swing arm assembly in a closed position according to an illustrative embodiment of the present application.

The illustrative embodiments of the present application describe systems and methods of making and using systems for providing access to an assembly from a utility vault. In certain illustrative embodiments, the systems and methods are useful in systems including those for providing movable access for a wiring assembly into a service position from an open vault. In one illustrative example, a swing arm assembly includes a latch that provides hands-free operation so that a technician has better access to manipulate the enclosure and the swing arm assembly.

In another illustrative embodiment, a swing arm assembly includes a portion connected to an enclosure that is rotatable around an axis such as including the ability to rotate the enclosure at least 45-90 or more degrees. In another illustrative embodiment, a swing arm assembly includes a portion connected to an enclosure that is rotatable around an axis such as including the ability to rotate and to be temporarily fixed in a service position. As shown below, a slot including a lower locking portion is used to provide a gravity-based lower locking position into the lower locking portion of the slot when the enclosure is rotated into a convenient access position. In one preferred embodiment, the enclosure temporarily locks into the locking portion after 90 degrees of rotation in the appropriate direction. In other embodiments, the convenient working position is at 45 degrees in the appropriate direction. In any of the embodiments herein, the slot may be alternatively replaced with an opening that might not be considered a slot such as a hole, for engaging a member that is permanently attached or installed in a portion of the swing arm assembly to facilitate telescoping, turning and/or locking. Additional mechanisms may be used to facilitate a swing arm enclosure having telescoping, rotating and locking characteristics.

In another illustrative embodiment, a swing arm assembly includes a tubular portion connected to an enclosure that is rotatable around an axis and that provides telescoping access to the enclosure such as for extending the enclosure laterally or for raising the enclosure to a higher position. As shown below, a spring loaded plunger may be used in conjunction with a slot to provide the telescoping tube with a locking position at a convenient height.

In another illustrative example, a swing arm assembly includes a latch that provides hands-free operation so that a technician has better access to manipulate the enclosure and the swing arm assembly, a tubular portion connected to an enclosure that is rotatable around an axis such as including the ability to rotate the enclosure at least 45-90 or more degrees, wherein the tubular, rotatable portion may be temporarily fixed in a service position using one-handed operation, and wherein the tubular, rotatable portion connected to the enclosure provides telescoping access to the enclosure such as for extending the enclosure laterally or for raising the enclosure to a higher position.

In another illustrative example, a vault includes one or more swing arm assemblies, such as a device including three swing arm assemblies. Each swing arm assembly includes a vault mount at an approximately 20 degree angle (A) shown in FIG. 16, such as including an angle in the range of 10-30 degrees or 15-25 degrees or approximately 20 degrees. Each swing arm assembly includes a latch that provides hands-free operation so that a technician has better access to manipulate the enclosure and the swing arm assembly, a tubular portion connected to an enclosure that is rotatable around an axis such as including the ability to rotate the enclosure 360 degrees, or 180 degrees in an alternative, wherein the tubular, rotatable portion may be temporarily fixed in a service position using one-handed operation, and wherein the tubular, rotatable portion connected to the enclosure provides telescoping access to the enclosure such as for extending the enclosure laterally or for raising the enclosure to a higher position, but that provides a measure of protection to prevent the tubular portion connected to the enclosure from being lifted off an inner tubular portion. In additional alternatives, the enclosure may be rotated 360 degrees or 359 degrees in an alternative, with one or more temporary fix points such as at 90, 180 and/or 270 degrees such as by using a hole deeper than the slot at those position(s).

Referring to FIG. 1, a top plan view of a system 1 including a swing arm assembly 100 having a mounted wiring enclosure 10 with the swing arm assembly 100 mounted to a vault 2 and with the swing arm assembly 100 in a closed position according to an illustrative embodiment of the present application is shown. The vault 2 in this illustrative embodiment includes two doors 3, 4 that are shown in the open position. These doors 3, 4 would be closed and optionally locked with a lock (not shown) when the vault 2 is in the closed position. The vault 2 would have at least one wiring entry/exit point (not shown) and would include wiring entering and exiting the wiring enclosure 10, such wiring all not shown for clarity.

Figure 2:
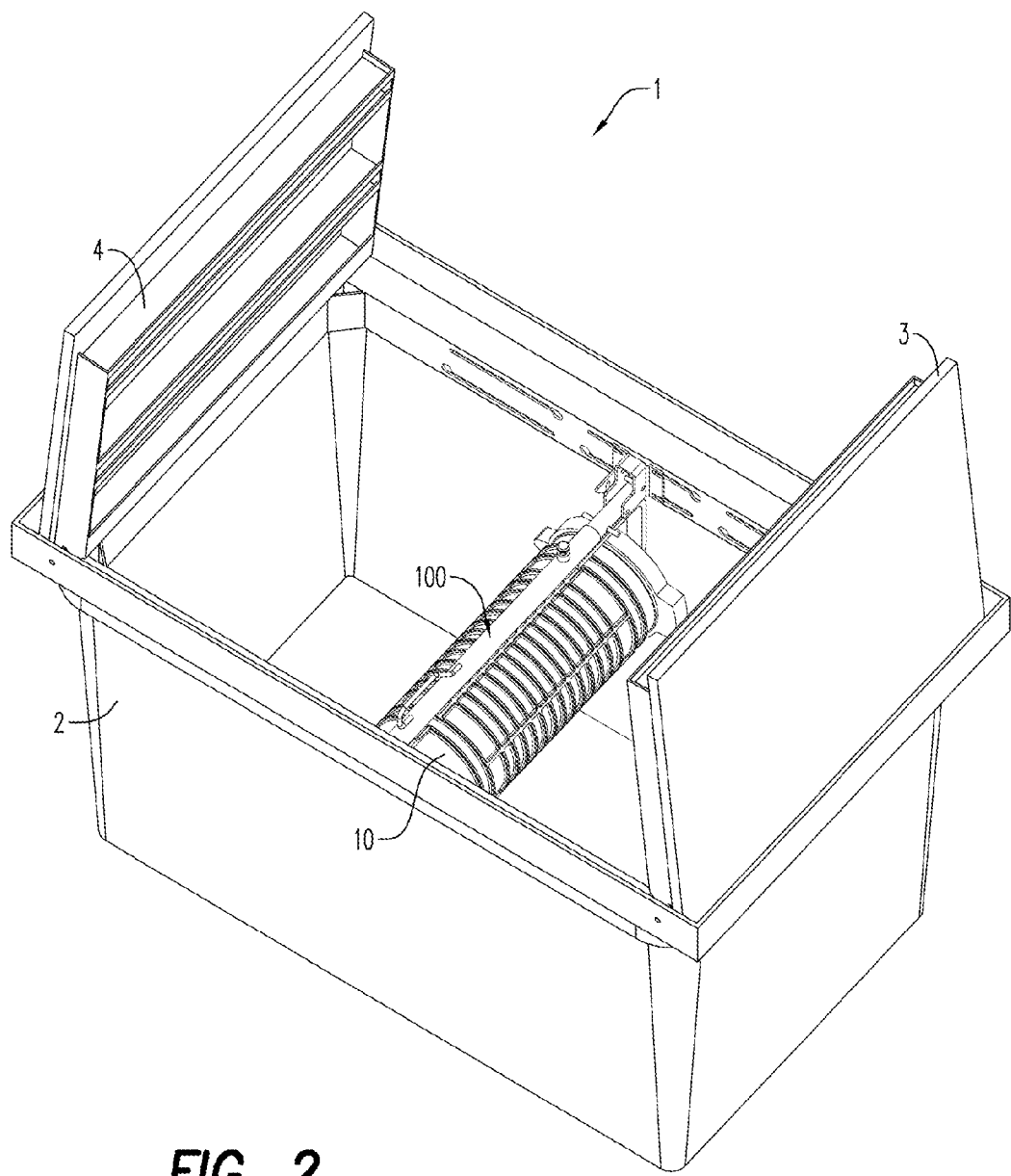
FIG. 2 is a top perspective view of a swing arm assembly having a mounted enclosure with the swing arm assembly mounted to a vault and with the swing arm assembly in a closed position according to an illustrative embodiment of the present application.

Referring to FIG. 2, a top perspective view of a system 1 including swing arm assembly 100 having a mounted wiring enclosure 10 with the swing arm assembly 100 mounted to a vault 2 and with the swing arm assembly 100 in a closed position according to an illustrative embodiment of the present application is shown. The vault 2 in this illustrative embodiment includes two doors 3, 4 that are shown in the open position. The door may optionally have latches (not shown) to keep the doors in an open position during servicing of the wiring enclosure.

Figure 3:
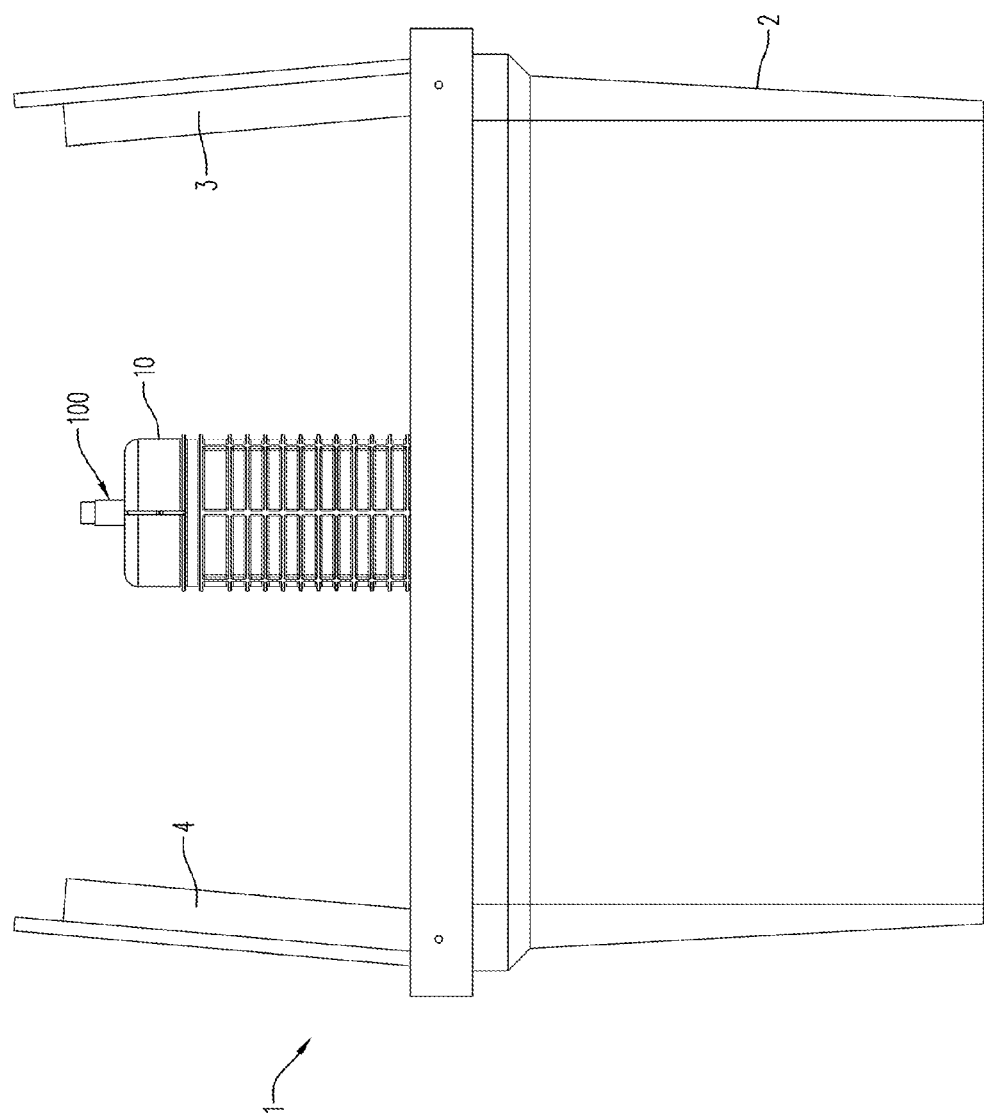
FIG. 3 is a side plan view of a swing arm assembly having a mounted enclosure with the swing arm assembly mounted to a vault and with the swing arm assembly in a first open position according to an illustrative embodiment of the present application.

Referring to FIG. 3, a side plan view of a system 1 including a swing arm assembly 100 having a mounted wiring enclosure 10 with the swing arm assembly 100 mounted to a vault 2 and with the swing arm assembly 100 in a first open position according to an illustrative embodiment of the present application is shown. The vault 2 in this illustrative embodiment includes two doors 3, 4 that are shown in the open position. As can be appreciated, the first open position provides some access to the wiring enclosure, but at a height that might not be convenient for a technician.

Figure 4:
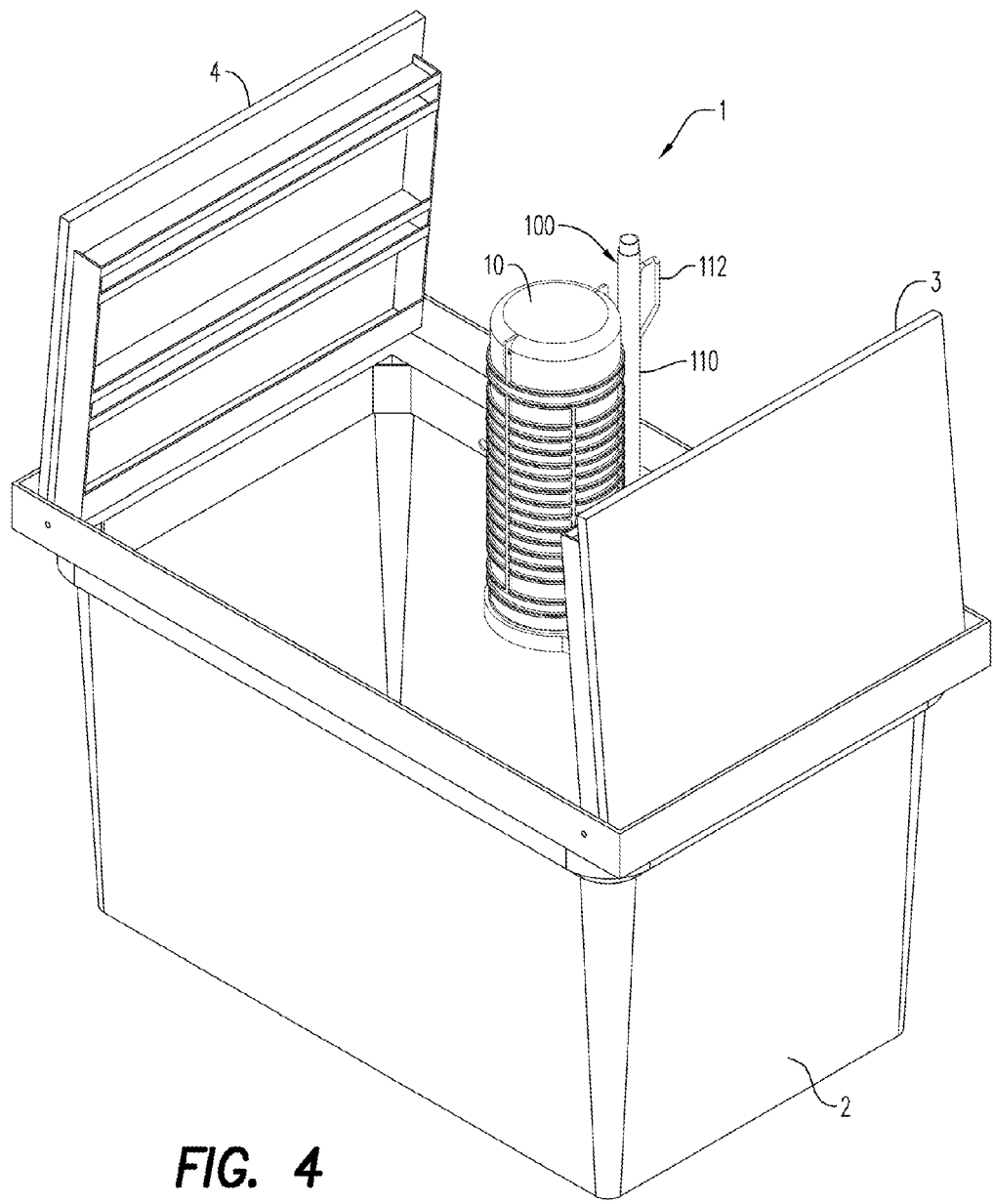
FIG. 4 is a side perspective view of a swing arm assembly having a mounted enclosure with the swing arm assembly mounted to a vault and with the swing arm assembly in a first open position according to an illustrative embodiment of the present application.

Referring to FIG. 4, a side perspective view of a system 1 including a swing arm assembly 100 having a mounted wiring enclosure 10 with the swing arm assembly 100 mounted to a vault 2 and with the swing arm assembly 100 in a first open position according to an illustrative embodiment of the present application is shown. The vault 2 in this illustrative embodiment includes two doors 3, 4 that are shown in the open position. As can be appreciated, the first open position provides some access to the wiring enclosure, but at a height that might not be convenient for a technician. Here, the outer tube 110 is shown with handle 112 that can be used to lift the wiring enclosure 10 into the first open position.

Figure 5:
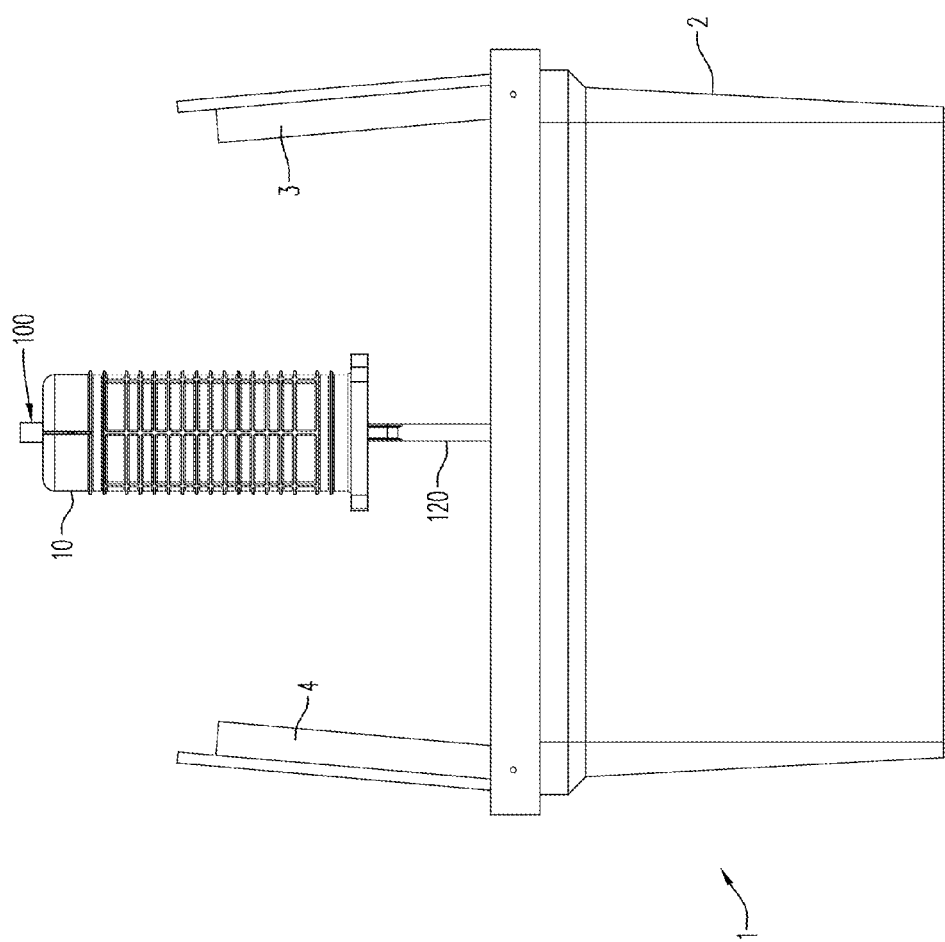
FIG. 5 is a side plan view of a swing arm assembly having a mounted enclosure with the swing arm assembly mounted to a vault and with the swing arm assembly in a second open position according to an illustrative embodiment of the present application.

Referring to FIG. 5, a side plan view of a system 1 including a swing arm assembly 100 having a mounted wiring enclosure 10 with the swing arm assembly 100 mounted to a vault 2 and with the swing arm assembly 100 in a second open position according to an illustrative embodiment of the present application is shown. The vault 2 in this illustrative embodiment includes two doors 3, 4 that are shown in the open position. As can be appreciated, the second open position provides some greater access to the wiring enclosure 10, at a height that might be more convenient for a technician than that shown in FIG. 4. Here, the inner tube 120 is shown because the outer tube is raised thereby exposing the inner tube 120. Here, the orientation might not be as convenient because the outer tube may block convenient access to the wiring enclosure 10.

In another feature of this illustrative embodiment, the swing arm assembly 100 includes a portion connected to an enclosure that is rotatable around an axis such as including the ability to rotate and to be temporarily fixed in a service position and fixed to prevent raising the enclosure to an even higher position including preventing the tubular portion connected to the enclosure from being lifted off of a base telescoping tubular portion. For example, the biased, preferably spring loaded plunger 114 is shown engaged into a slot in inner tube 120 (not shown) in order to lock the outer tube 110 in the second open position. This configuration prevents the user from raising the enclosure to an even higher position including preventing the user from lifting the outer tube 110 above and off the inner tube 120.

Figure 6:
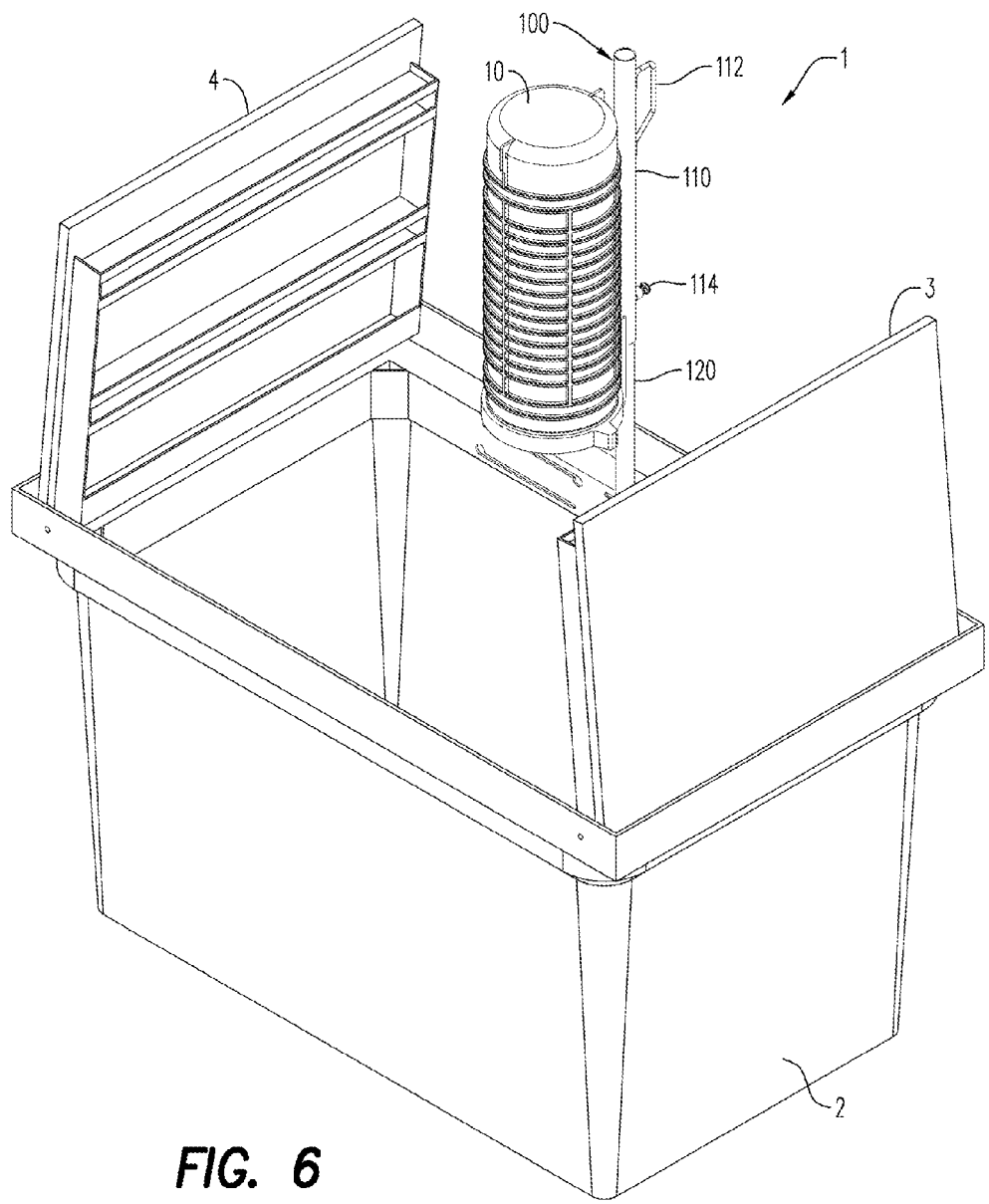
FIG. 6 is a side perspective view of a swing arm assembly having a mounted enclosure with the swing arm assembly mounted to a vault and with the swing arm assembly in a second open position according to an illustrative embodiment of the present application.

Referring to FIG. 6, a side perspective view of a system 1 including a swing arm assembly 100 having a mounted wiring enclosure 10 with the swing arm assembly 100 mounted to a vault 2 and with the swing arm assembly 100 in a second open position according to an illustrative embodiment of the present application is shown. The vault 2 in this illustrative embodiment includes two doors 3, 4 that are shown in the open position. As can be appreciated, the second open position provides some greater access to the wiring enclosure 10, at a height that might be more convenient for a technician than that shown in FIG. 4. Here, the inner tube 120 is shown because the outer tube 110 is raised thereby exposing the inner tube 120. Here, the orientation might not be as convenient because the outer tube 110 may block convenient access to the wiring enclosure 10. Handle 112 is shown on the outer tube 110. Additionally, the biased, preferably spring loaded plunger 114 is shown engaged into a slot in inner tube 120 (not shown) in order to lock the outer tube 110 in the second open position. The slot in inner tube 120 permits rotation from the second open position to at least a third open position.

Figure 7:
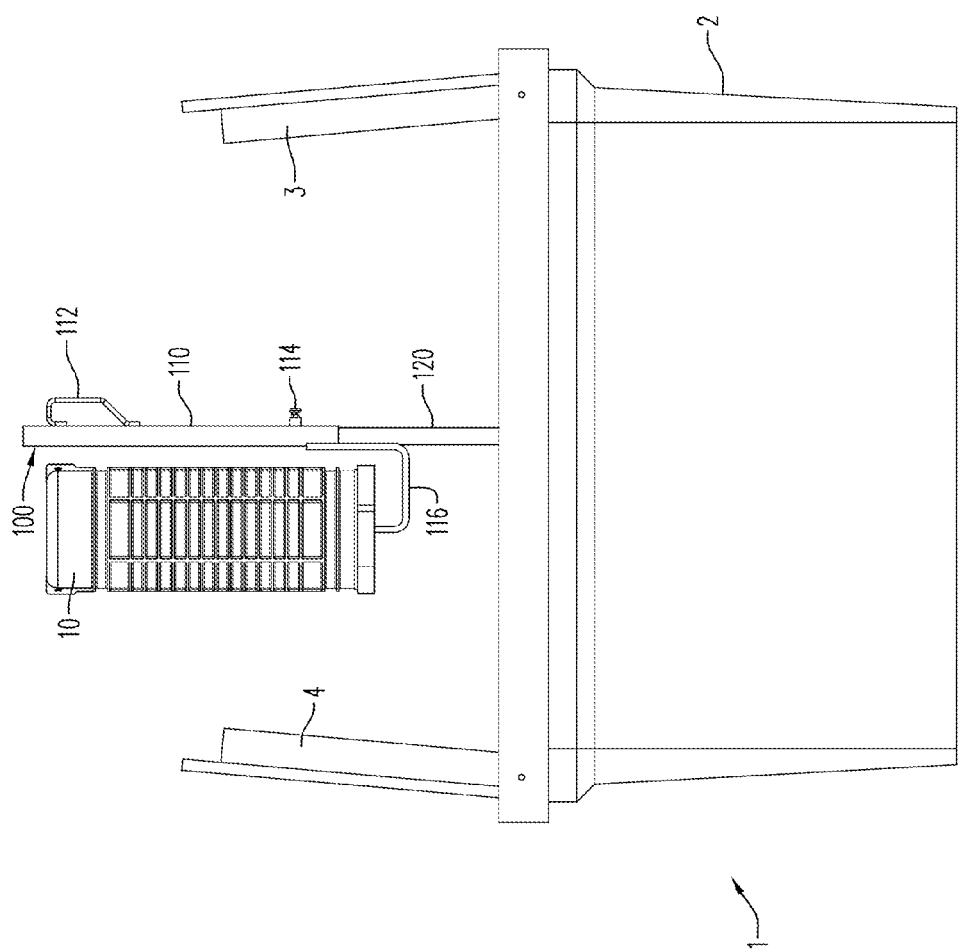
FIG. 7 is a side plan view of a swing arm assembly having a mounted enclosure with the swing arm assembly mounted to a vault and with the swing arm assembly in a third open position according to an illustrative embodiment of the present application.

Referring to FIG. 7, a side plan view of a system 1 including a swing arm assembly 100 having a mounted wiring enclosure 10 with the swing arm assembly 100 mounted to a vault 2 and with the swing arm assembly 100 in a third open position according to an illustrative embodiment of the present application is shown. The vault 2 in this illustrative embodiment includes two doors 3, 4 that are shown in the open position. As can be appreciated, the third open position provides some greater access to the wiring enclosure 10, at a height and orientation that might be more convenient for a technician than that shown in FIG. 4. Here, the inner tube 120 is shown because the outer tube 110 is raised thereby exposing the inner tube 120. Here, the orientation may be more convenient because the outer tube 110 no longer blocks convenient access to the wiring enclosure 10 because it has been rotated by approximately 90 degrees. Handle 112 is shown on the outer tube 110. Additionally, the biased, preferably spring loaded plunger 114 is shown engaged into a locking portion of a slot in inner tube 120 (not shown) in order to lock the outer tube 110 in the third open position. The slot in inner tube 120 permits rotation from the second open position to at least a third open position and the locking portion of the slot allows gravity and the weight of the wiring enclosure 10 to temporarily lock the swing arm assembly 100 into the third open position. In order to change the position, the technician would pull spring loaded plunger 114. In order to change the position of the wiring enclosure 10 to the closed position, the technician would rotate back 90 degrees and release the latch (not shown) in order to lower the wiring enclosure 10. Here, the wiring enclosure 10 is mounted to the outer tube 110 by a mounting bracket 116.

Figure 8:
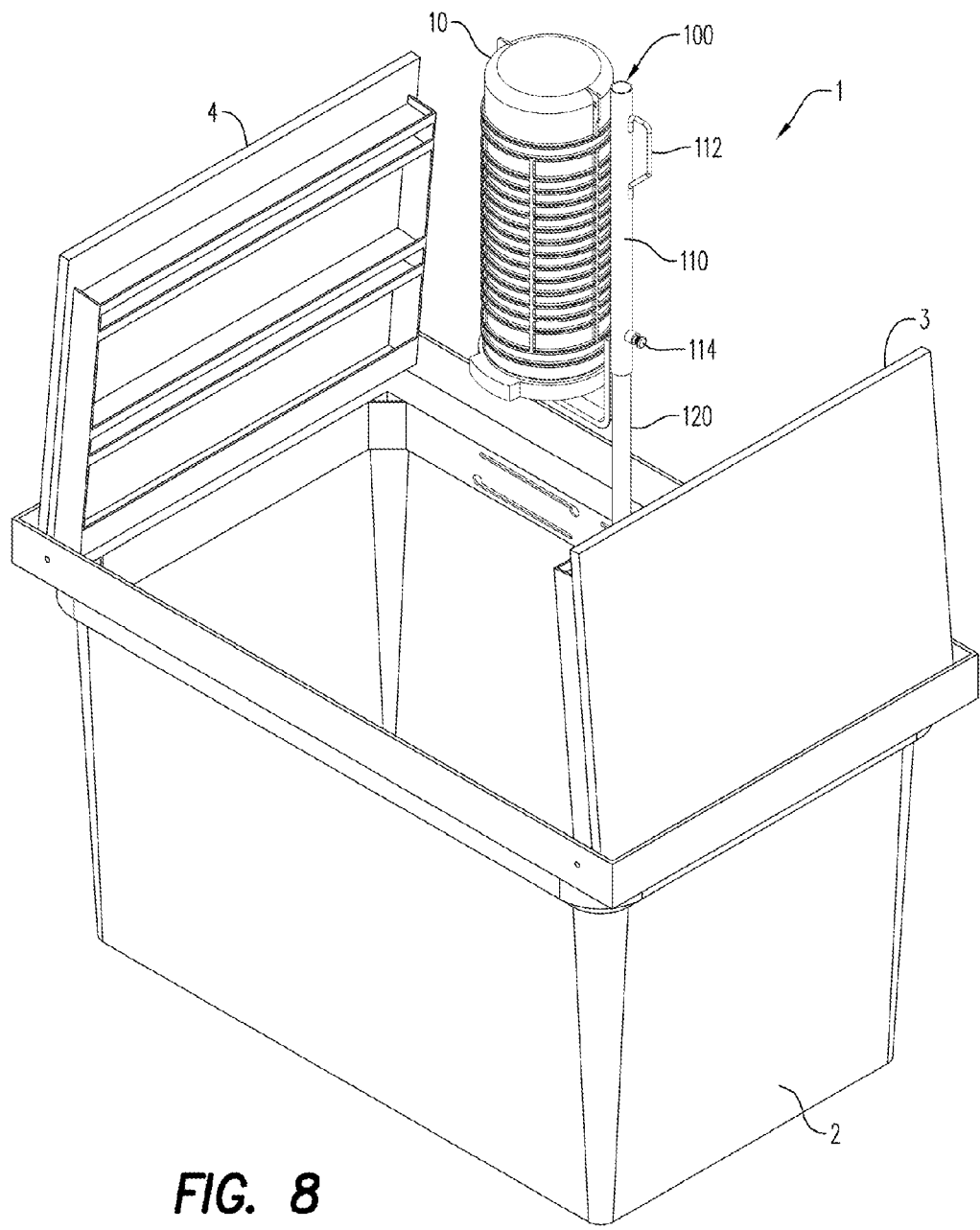
FIG. 8 is a side perspective view of a swing arm assembly having a mounted enclosure with the swing arm assembly mounted to a vault and with the swing arm assembly in a third open position according to an illustrative embodiment of the present application.

Referring to FIG. 8, a side perspective view of a system 1 including a swing arm assembly 100 having a mounted wiring enclosure 10 with the swing arm assembly 100 mounted to a vault 2 and with the swing arm assembly 100 in a third open position according to an illustrative embodiment of the present application is shown. The vault 2 in this illustrative embodiment includes two doors 3, 4 that are shown in the open position. As can be appreciated, the third open position provides some greater access to the wiring enclosure 10, at a height and orientation that might be more convenient for a technician than that shown in FIG. 4. Here, the inner tube 120 is shown because the outer tube 110 is raised thereby exposing the inner tube 120 Here, the orientation may be more convenient because the outer tube 110 no longer blocks convenient access to the wiring enclosure 10 because it has been rotated by approximately 90 degrees. Handle 112 is shown on the outer tube 110. Additionally, the biased, preferably spring loaded plunger 114 is shown engaged into a locking portion of a slot in inner tube 120 (not shown) in order to lock the outer tube 110 in the third open position. The slot in inner tube 120 permits rotation from the second open position to at least a third open position and the locking portion of the slot allows gravity and the weight of the wiring enclosure 10 to temporarily lock the swing arm assembly 100 into the third open position. In order to change the position, the technician would pull spring loaded plunger 114. In order to change the position of the wiring enclosure 10 to the closed position, the technician would rotate back 90 degrees and release the latch (not shown) in order to lower the wiring enclosure 10. Here, the wiring enclosure 10 is mounted to the outer tube 110 by a mounting bracket 116. In certain embodiments, a locking portion 126 is on each side of the inner tube slot that allows the wiring enclosure to be temporarily locked at 90 degrees either direction.

Figure 9:
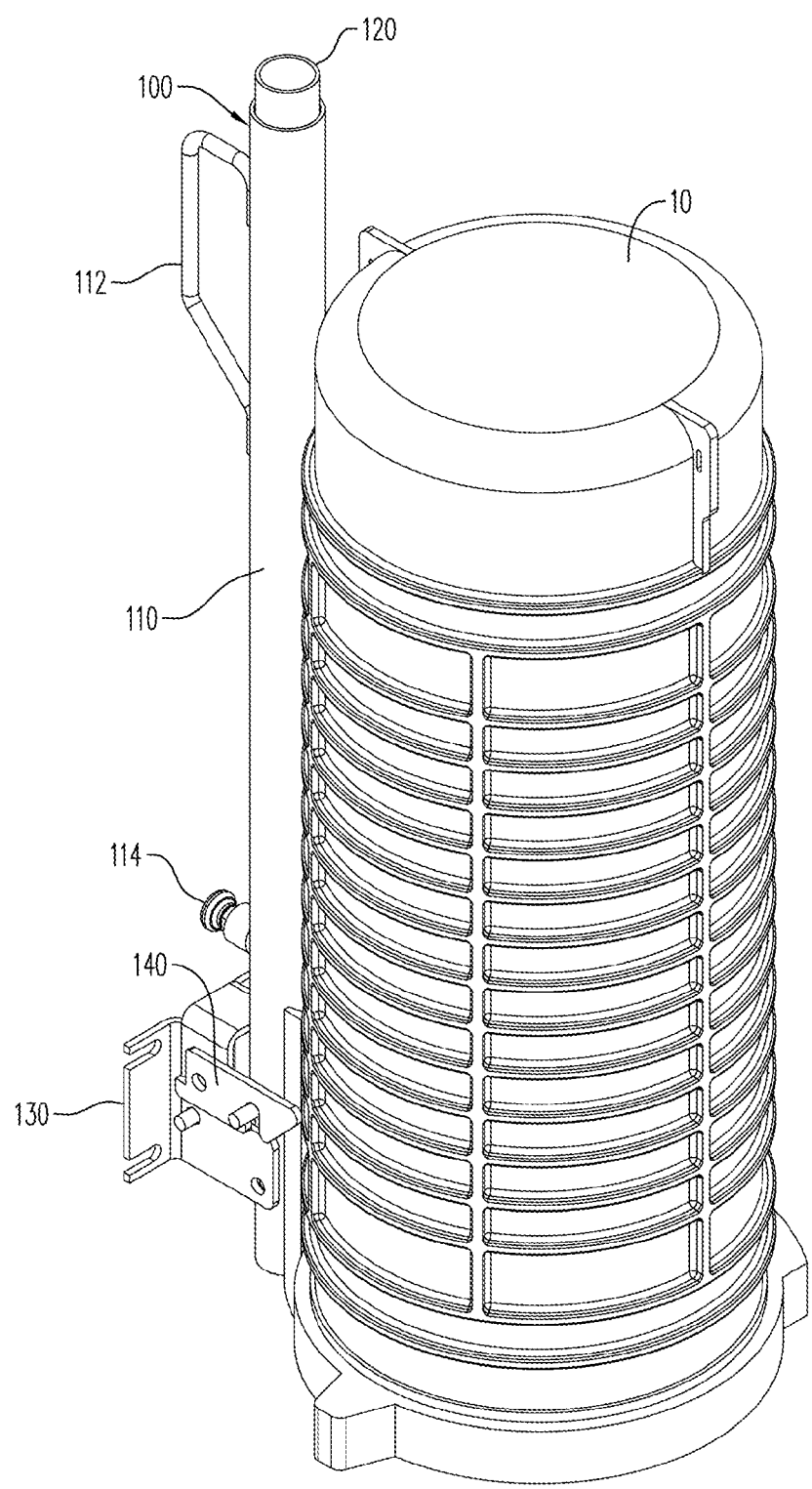
FIG. 9 is a perspective view of a swing arm assembly having a mounted enclosure with the swing arm assembly in a first open position according to an illustrative embodiment of the present application.

Referring to FIG. 9, a perspective view of a swing arm assembly 100 having a mounted wiring enclosure 10 with the swing arm assembly 100 in a first open position according to an illustrative embodiment of the present application is shown. Here, the inner tube 120 is shown because it protrudes slightly through the top of the outer tube 110. Handle 112 is shown on the outer tube 110. Additionally, the biased, preferably spring loaded plunger 114 is shown. If a lower locking position is desired, a lower slot in inner tube 120 (not shown) would be provided for engaging the spring loaded plunger in the first open position. If it is desired that the outer tube 110 not rotate in that position, then the slot would instead be a hole slightly larger than the plunger distal end (not shown). Here, mounting bracket 130 is shown with latch 140 in the locked position.

Figure 10:
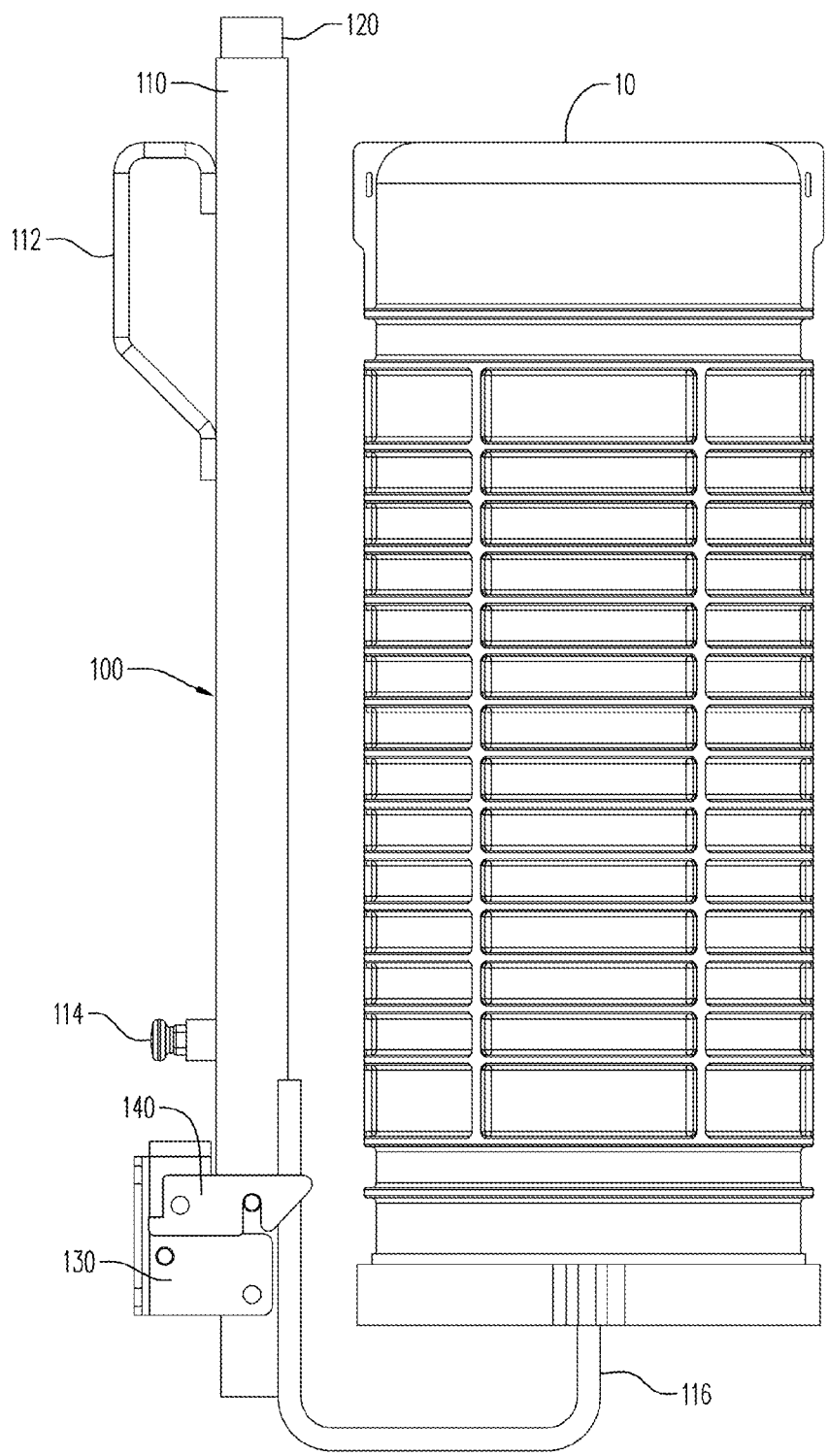
FIG. 10 is a side plan view of a swing arm assembly having a mounted enclosure with the swing arm assembly in a first open position according to an illustrative embodiment of the present application.

Referring to FIG. 10, a side plan view of a swing arm assembly 100 having a mounted wiring enclosure 10 with the swing arm assembly 100 in a first open position according to an illustrative embodiment of the present application is shown. Here, the inner tube 120 is shown because it protrudes slightly through the top of the outer tube 110. Handle 112 is shown on the outer tube 110. Additionally, the biased, preferably spring loaded plunger 114 is shown. If a lower locking position is desired, a lower slot in inner tube 120 (not shown) would be provided for engaging the spring loaded plunger in the first open position. If it is desired that the outer tube 110 not rotate in that position, then the slot would instead be a hole slightly larger than the plunger distal end (not shown). Here, mounting bracket 130 is shown with latch 140 in the locked position. Additionally, the wiring enclosure 10 is shown connected to the outer tube 110 using mounting bracket 116.

Figure 11:
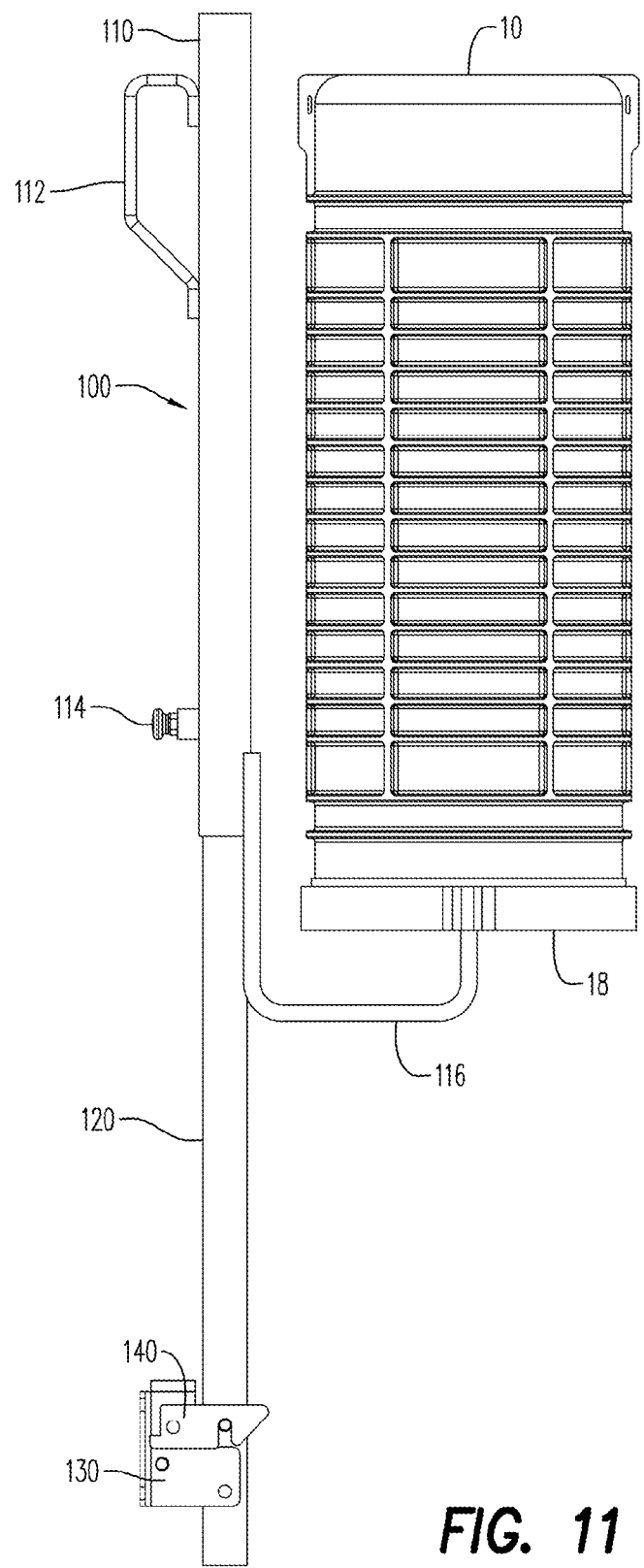
FIG. 11 is a side plan view of a swing arm assembly having a mounted enclosure with the swing arm assembly in a second open position according to an illustrative embodiment of the present application.

Referring to FIG. 11, a side plan view of a swing arm assembly 100 having a mounted wiring enclosure 10 with the swing arm assembly 100 in a second open position according to an illustrative embodiment of the present application is shown. Here, the inner tube 120 is shown because the outer tube 110 has been lifted up and away. Handle 112 is shown on the outer tube 110. Additionally, the biased, preferably spring loaded plunger 114 is shown engaged in a slot in inner tube 120 (not shown). Here, mounting bracket 130 is shown with latch 140 in the locked position. Additionally, the wiring enclosure 10 is shown connected to the outer tube 110 using mounting bracket 116 attached to a mounting portion 18 of the wiring enclosure 10.

Figure 12:
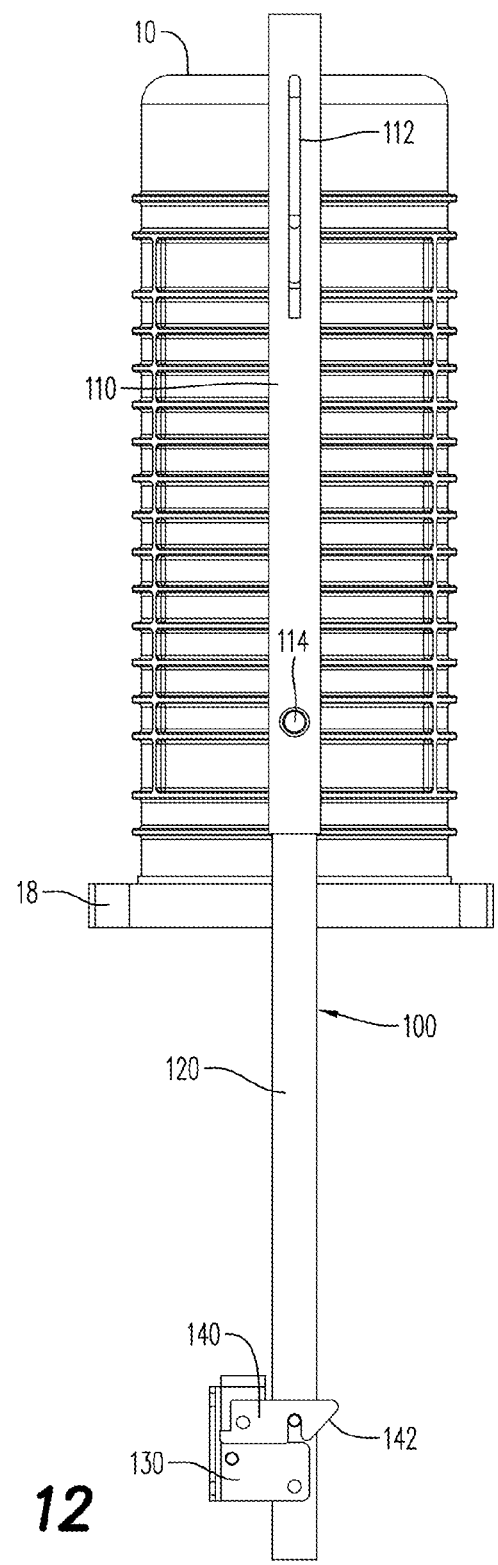
FIG. 12 is a side plan view of a swing arm assembly having a mounted enclosure with the swing arm assembly in a third open position according to an illustrative embodiment of the present application.

Referring to FIG. 12, a side plan view of a swing arm assembly 100 having a mounted wiring enclosure 10 with the swing arm assembly 100 in a third open position according to an illustrative embodiment of the present application is shown. Here, the inner tube 120 is shown because the outer tube 110 has been lifted up and away and rotated approximately 90 degrees. Handle 112 is shown on the outer tube 110. Additionally, the biased, preferably spring loaded plunger 114 is shown engaged in a slot in inner tube 120 (not shown). Here, mounting bracket 130 is shown with latch 140 in the locked position. The latch 140 includes a cam surface 142 that engages the latch pin automatically without requiring that a technician lift the latch. Additionally, the wiring enclosure 10 is shown connected to the outer tube 110 using mounting bracket (not shown) attached to a mounting portion 18 of the wiring enclosure 10.

Figure 13:
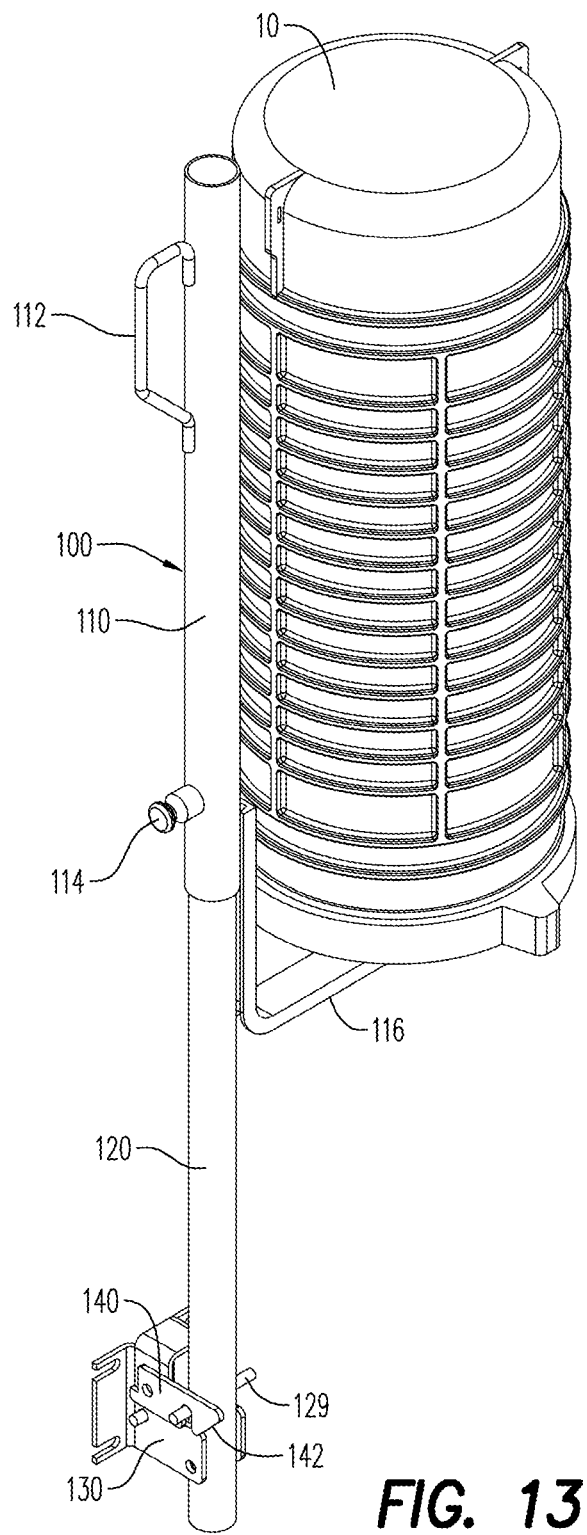
FIG. 13 is a side perspective view of a swing arm assembly having a mounted enclosure with the swing arm assembly in a third open position according to an illustrative embodiment of the present application.

Referring to FIG. 13, a side perspective view of a swing arm assembly 100 having a mounted wiring enclosure 10 with the swing arm assembly 100 in a third open position according to an illustrative embodiment of the present application is shown. Here, the inner tube 120 is shown because the outer tube 110 has been lifted up and away and rotated approximately 90 degrees. Handle 112 is shown on the outer tube 110. Additionally, the biased, preferably spring loaded plunger 114 is shown engaged in a slot in inner tube 120 (not shown). Here, mounting bracket 130 is shown with latch 140 in the locked position. The latch 140 includes a cam surface 142 that engages the latch pin 129 automatically without requiring that a technician lift the latch. Additionally, the wiring enclosure 10 is shown connected to the outer tube 110 using mounting bracket 116 attached to a mounting portion 18 of the wiring enclosure 10.

Figure 14:
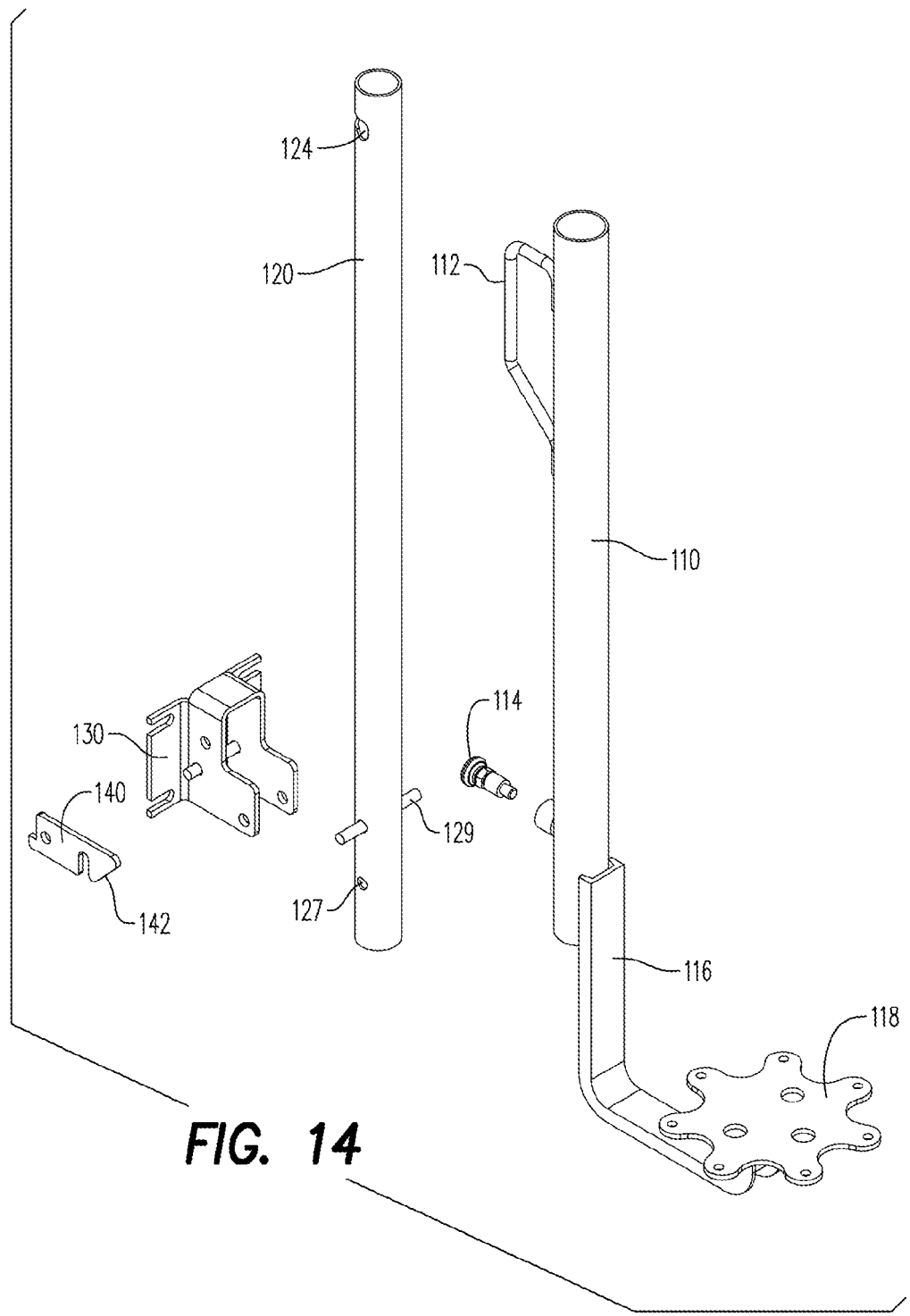
FIG. 14 is a perspective view of an unassembled swing arm assembly according to an illustrative embodiment of the present application.

Referring to FIG. 14, a perspective view of an unassembled swing arm assembly 100 according to an illustrative embodiment of the present application is shown. Here, the inner tube 120 is shown with latch pin 129 installed. The slot 124 that engages biased plunger 114 is shown. In the illustrated embodiment, slot 124 is defined through inner tube 120 and is generally linear so that the slot has a length that extends in a general circumferential direction. In some embodiments, slot 124 can be angled or curved (not shown) along the circumference. The length of slot 124 defines the amount of rotation of outer tube 110 with respect to inner tube. Since slot 124 is defined through inner tube 120, the length of the slot is limited by a remaining portion 125 of the inner tube shown in FIG. 15c.

Handle 112 is shown on the outer tube 110 and spring loaded plunger 114 is shown disassembled from outer tube 110. Outer tube 110 is connected to wiring enclosure mounting bracket 16 that is connected to universal wiring enclosure mounting plate 118. The mounting plate 118 or adapter is adapted to receive interchangeably at least two different types of wiring enclosures. Here, mounting bracket 130 is shown disassembled. The disassembled latch 140 includes a cam surface 142 that engages the latch pin 129 automatically without requiring that a technician lift the latch.

Referring to FIG. 15, a perspective view of an inner tube 120 for a swing arm assembly according to an illustrative embodiment of the present application is shown.

Figures 15A, 15B, 15C:
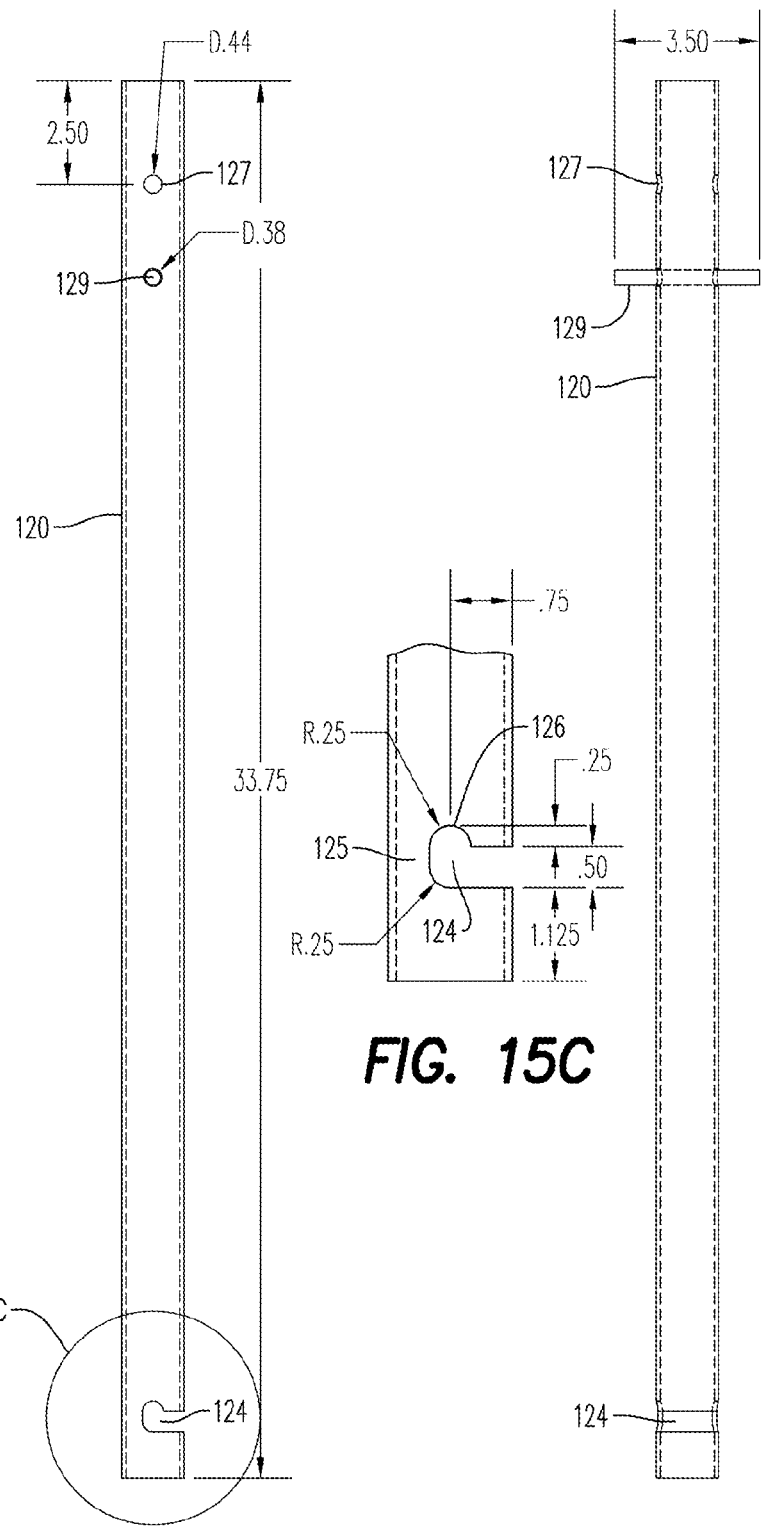
FIG. 15A is a perspective view of an inner tube for a swing arm assembly according to an illustrative embodiment of the present application.
FIG. 15B is a perspective view of an inner tube for a swing arm assembly according to an illustrative embodiment of the present application.
FIG. 15C is a perspective view of a portion of an inner tube for a swing arm assembly according to an illustrative embodiment of the present application.

Referring to FIG. 15A, a perspective view of an inner tube 120 for a swing arm assembly according to an illustrative embodiment of the present application is shown. Pin 129 is shown installed in the side view. Hole 127 is also shown in inner tube 120. Slot 124 is also shown.

Referring to FIG. 15B, a cutaway perspective view of an inner tube 120 for a swing arm assembly according to an illustrative embodiment of the present application is shown. Pin 129 is shown installed in the side view. Hole 127 is also shown in inner tube 120. Slot 124 is also shown.

Referring to FIG. 15C, a perspective view of a portion of an inner tube 120 for a swing arm assembly according to an illustrative embodiment of the present application is shown. The locking portion 126 of the slot 124 is shown in greater detail. Locking portion 126, much like slot 124, is defined through inner tube 120 and is generally linear but has a length that extends in a general longitudinal direction. Locking portion 126 can be formed at any point along the length of slot 124. However, in the illustrated embodiment two locking portions 126 are shown, one positioned at each end of slot 124.

Figure 16:
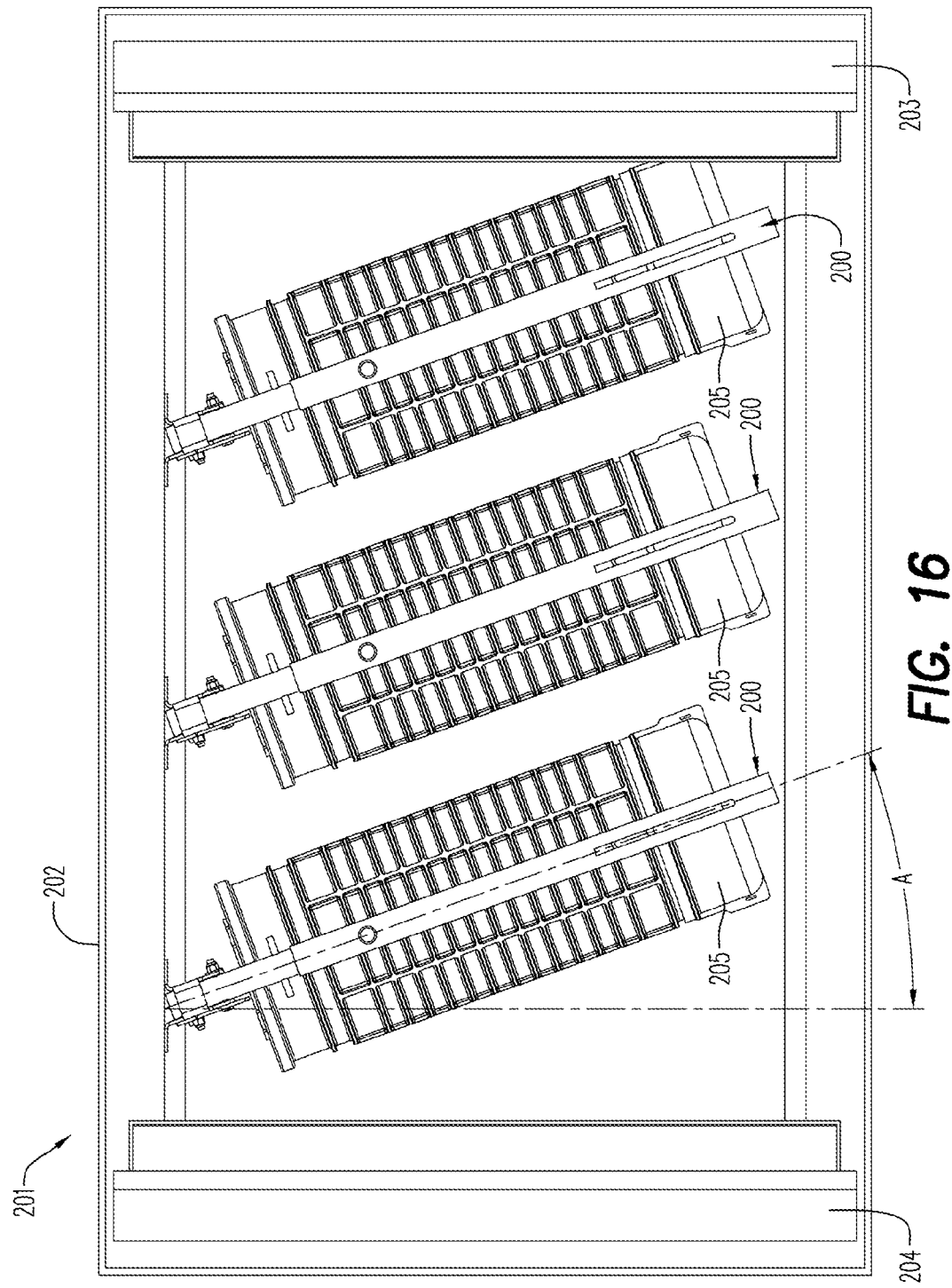
FIG. 16 is a top plan view of a representative vault system having three swing arm assemblies each having a mounted enclosure with the three swing arm assemblies mounted to a vault and with the swing arm assemblies in a closed position according to an illustrative embodiment of the present application.

Referring to FIG. 16, a top plan view of a representative vault system 201 having a swing arm assembly 200 (three shown) each having a mounted enclosure 205 with the three swing arm assemblies mounted to a vault 202 and with the swing arm assemblies in a closed position according to an illustrative embodiment of the present application is shown. The vault 202 in this illustrative embodiment includes two doors 203, 204 that are shown in the open position. These doors 203, 204 would be closed and optionally locked with a lock (not shown) when the vault 202 is in the closed position. The vault 202 would have at least one wiring entry/exit point (not shown) and would include wiring entering and exiting the wiring enclosures 205, such wiring all not shown for clarity.

Figure 17:
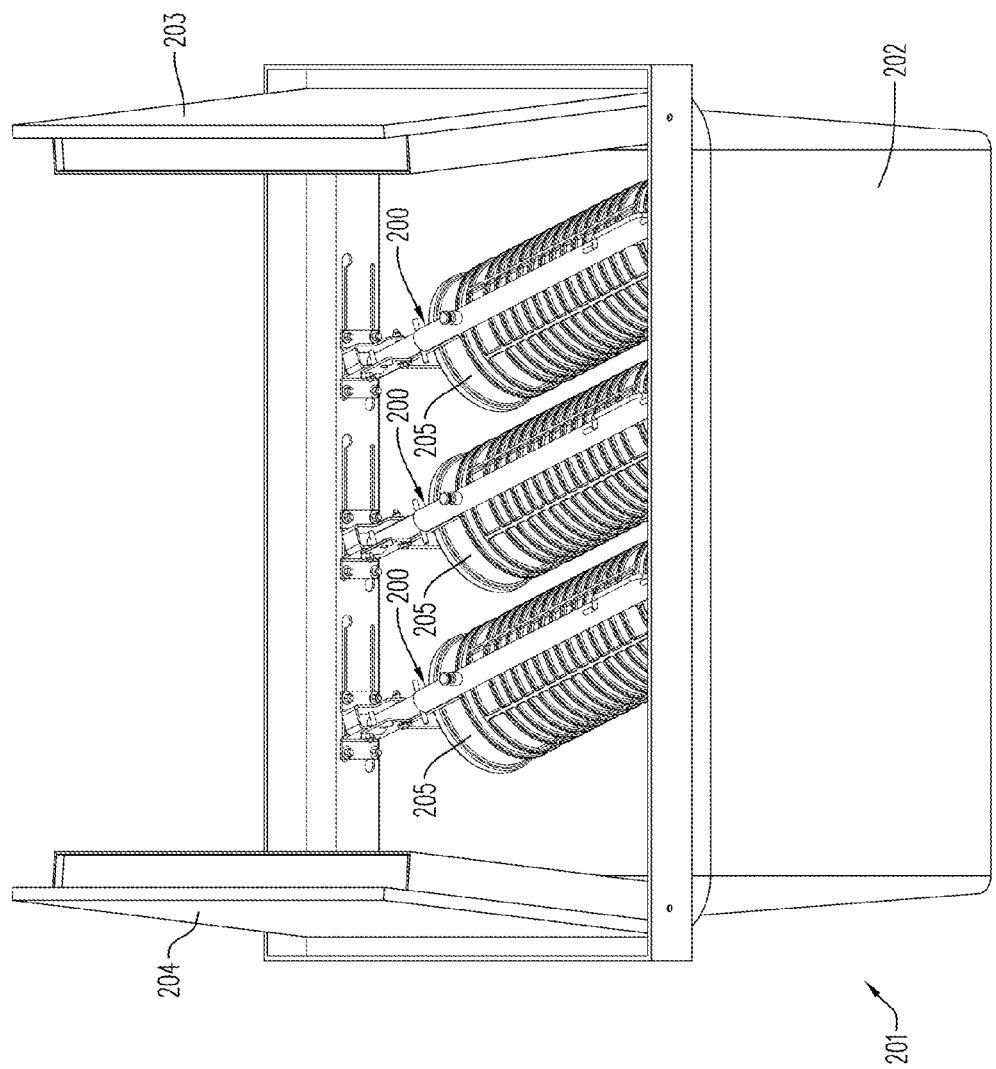
FIG. 17 is a top perspective view of a representative vault system having three swing arm assemblies each having a mounted enclosure with the three swing arm assemblies mounted to a vault and with the swing arm assemblies in a closed position according to an illustrative embodiment of the present application.

Referring to FIG. 17, a top perspective view of a representative vault system 201 having a swing arm assembly 200 (three shown) each having a mounted enclosure 205 with the three swing arm assemblies mounted to a vault 202 and with the swing arm assemblies in a closed position according to an illustrative embodiment of the present application is shown. The vault 202 in this illustrative embodiment includes two doors 203, 204 that are shown in the open position. The door may optionally have latches (not shown) to keep the doors in an open position during servicing of the wiring enclosure.

Figure 18:
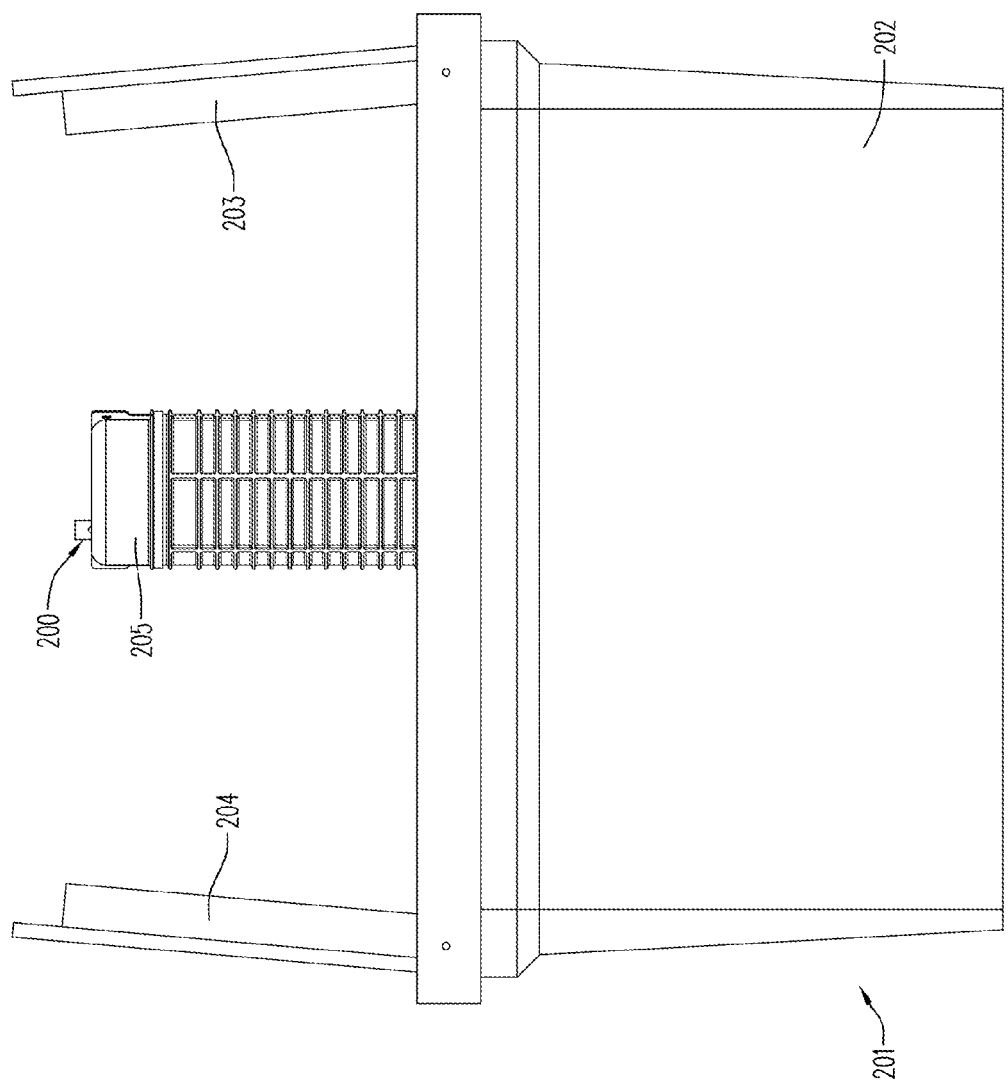
FIG. 18 is a side plan view of a representative vault system having three swing arm assemblies each having a mounted enclosure with the three swing arm assemblies mounted to a vault and with one of the swing arm assemblies in a first open position according to an illustrative embodiment of the present application.

Referring to FIG. 18, a side plan view of a representative vault system 201 having a swing arm assembly 200 (three shown) each having a mounted enclosure 205 with the three swing arm assemblies mounted to a vault 202 and with one of the swing arm assemblies in a first open position according to an illustrative embodiment of the present application is shown. The vault 202 in this illustrative embodiment includes two doors 203, 204 that are shown in the open position. As can be appreciated, the first open position provides some access to the wiring enclosure, but at a height that might not be convenient for a technician.

Figure 19:
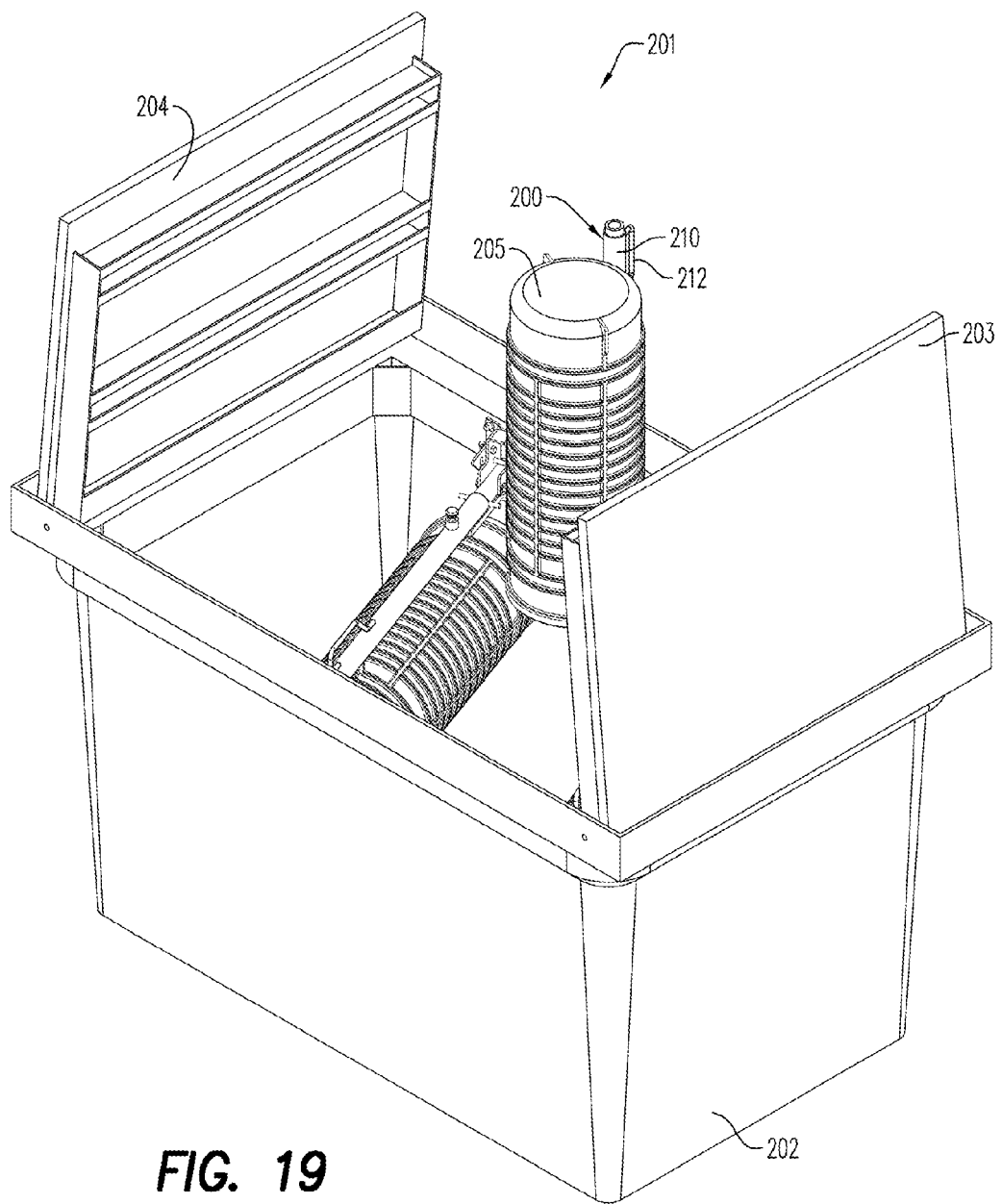
FIG. 19 is a side perspective view of a representative vault system having three swing arm assemblies each having a mounted enclosure with the three swing arm assemblies mounted to a vault and with one of the swing arm assemblies in a first open position according to an illustrative embodiment of the present application.

Referring to FIG. 19, a side perspective view of a representative vault system 201 a swing arm assembly 200 (three shown) each having a mounted enclosure 205 with the three swing arm assemblies mounted to a vault 202 and with one of the swing arm assemblies in a first open position according to an illustrative embodiment of the present application is shown. The vault 202 in this illustrative embodiment includes two doors 203, 204 that are shown in the open position. As can be appreciated, the first open position provides some access to the wiring enclosure, but at a height that might not be convenient for a technician. Here, the outer tube 210 is shown with handle 212 that can be used to lift the wiring enclosure 205 into the first open position.

Figure 20:
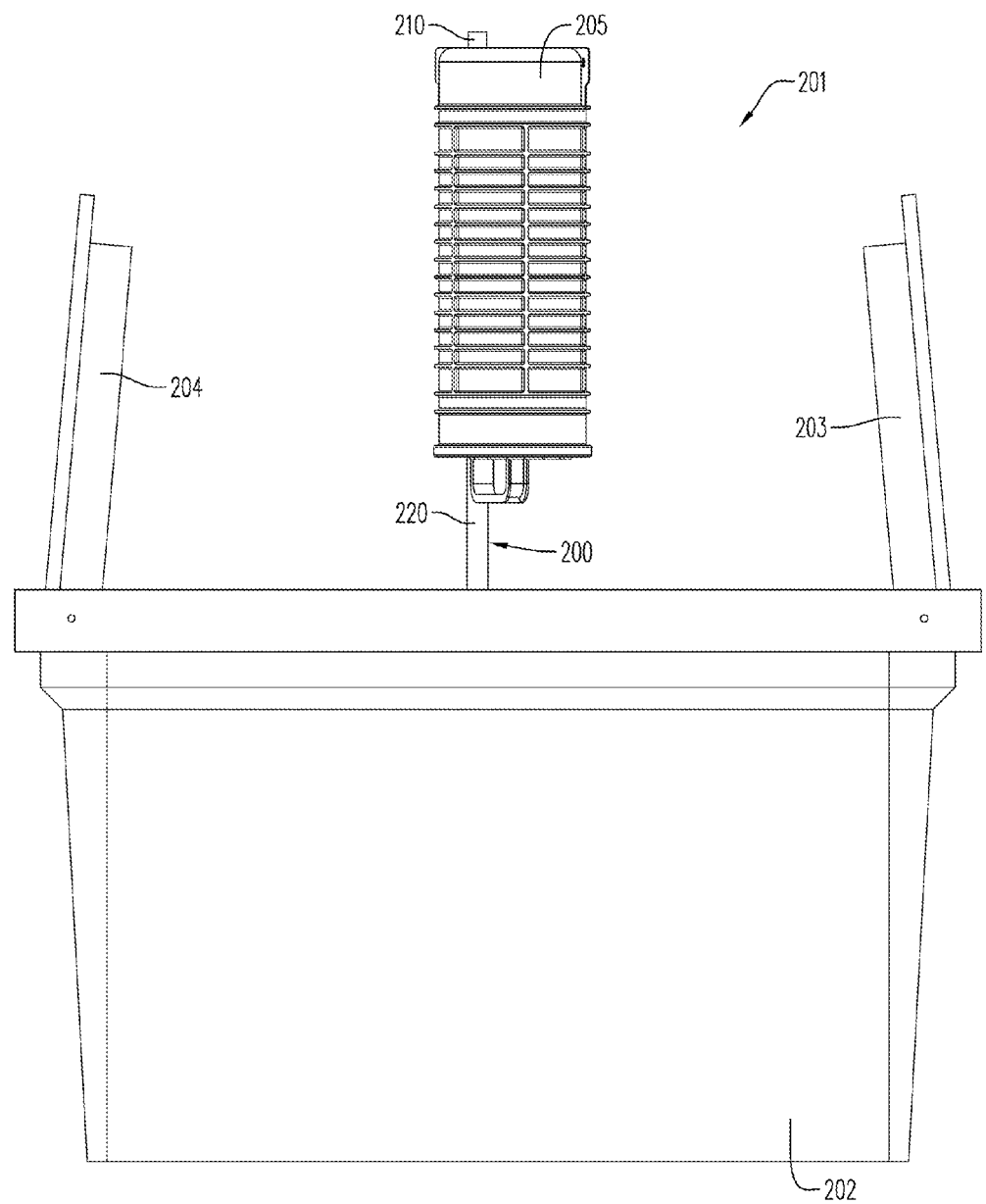
FIG. 20 is a side plan view of a representative vault system having three swing arm assemblies each having a mounted enclosure with the three swing arm assemblies mounted to a vault and with one of the swing arm assemblies in a second open position according to an illustrative embodiment of the present application.

Referring to FIG. 20, a side plan view of a representative vault system 201 having a swing arm assembly 200 (three shown) each having a mounted enclosure 205 with the three swing arm assemblies mounted to a vault 202 and with one of the swing arm assemblies in a second open position according to an illustrative embodiment of the present application is shown. The vault 202 in this illustrative embodiment includes two doors 203, 204 that are shown in the open position. As can be appreciated, the second open position provides some greater access to the wiring enclosure 205, at a height that might be more convenient for a technician than that shown in FIG. 19. Here, the inner tube 220 is shown because the outer tube 210 is raised thereby exposing the inner tube 220. Here, the orientation might not be as convenient because the outer tube 210 may block convenient access to the wiring enclosure 205.

Figure 21:
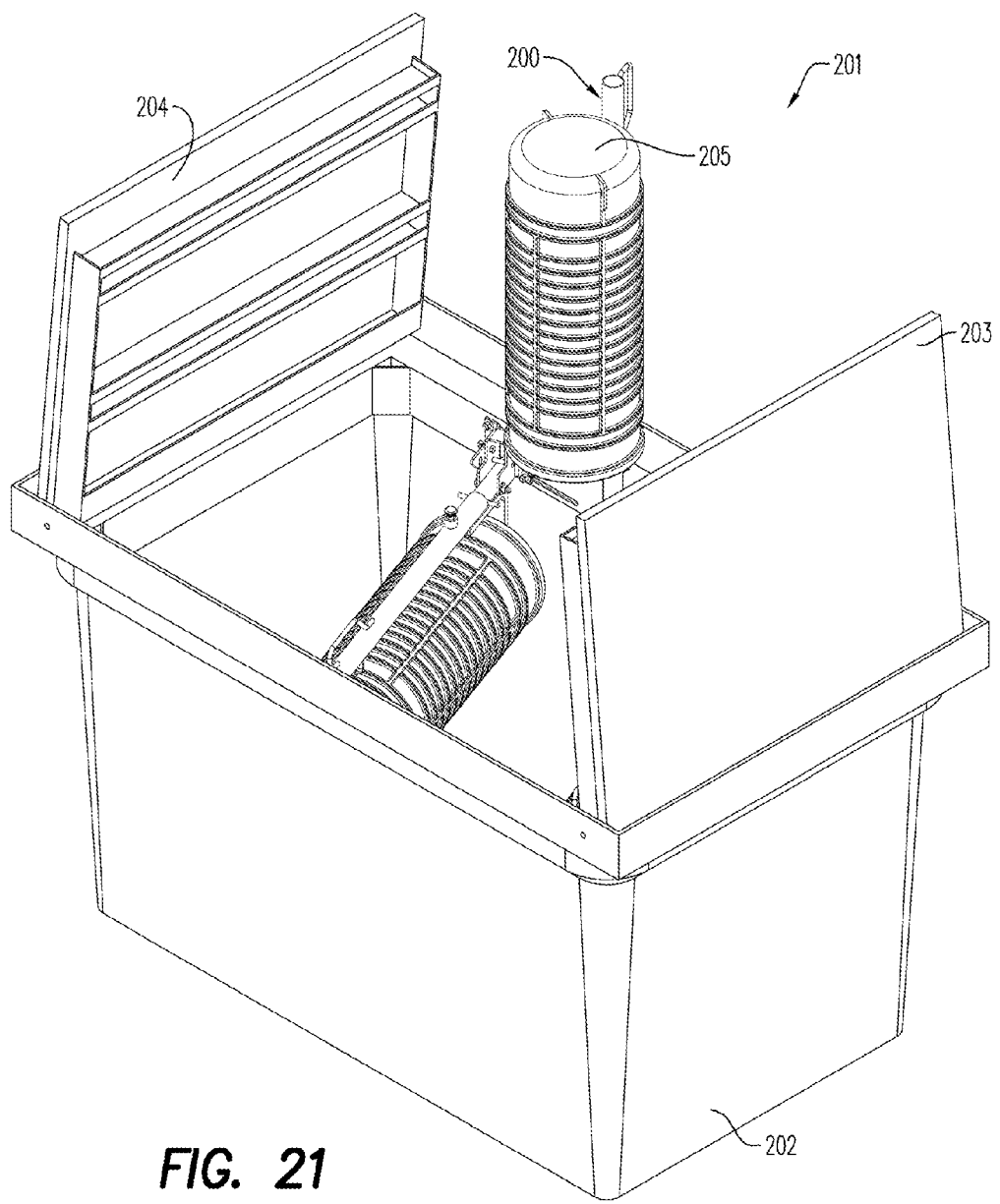
FIG. 21 is a side perspective view of a representative vault system having three swing arm assemblies each having a mounted enclosure with the three swing arm assemblies mounted to a vault and with one of the swing arm assemblies in a second open position according to an illustrative embodiment of the present application.

Referring to FIG. 21, a side perspective view of a representative vault system 201 having a swing arm assembly 200 (three shown) each having a mounted enclosure 205 with the three swing arm assemblies mounted to a vault 202 and with one of the swing arm assemblies in a second open position according to an illustrative embodiment of the present application is shown. The vault 202 in this illustrative embodiment includes two doors 203, 204 that are shown in the open position. As can be appreciated, the second open position provides some greater access to the wiring enclosure 205, at a height that might be more convenient for a technician than that shown in FIG. 19. Here, the swing arm assembly includes an inner tube with slot to engage a spring loaded pin to provide a measure of protection to prevent the outer tube from being lifted off the inner tube.

Figure 22:
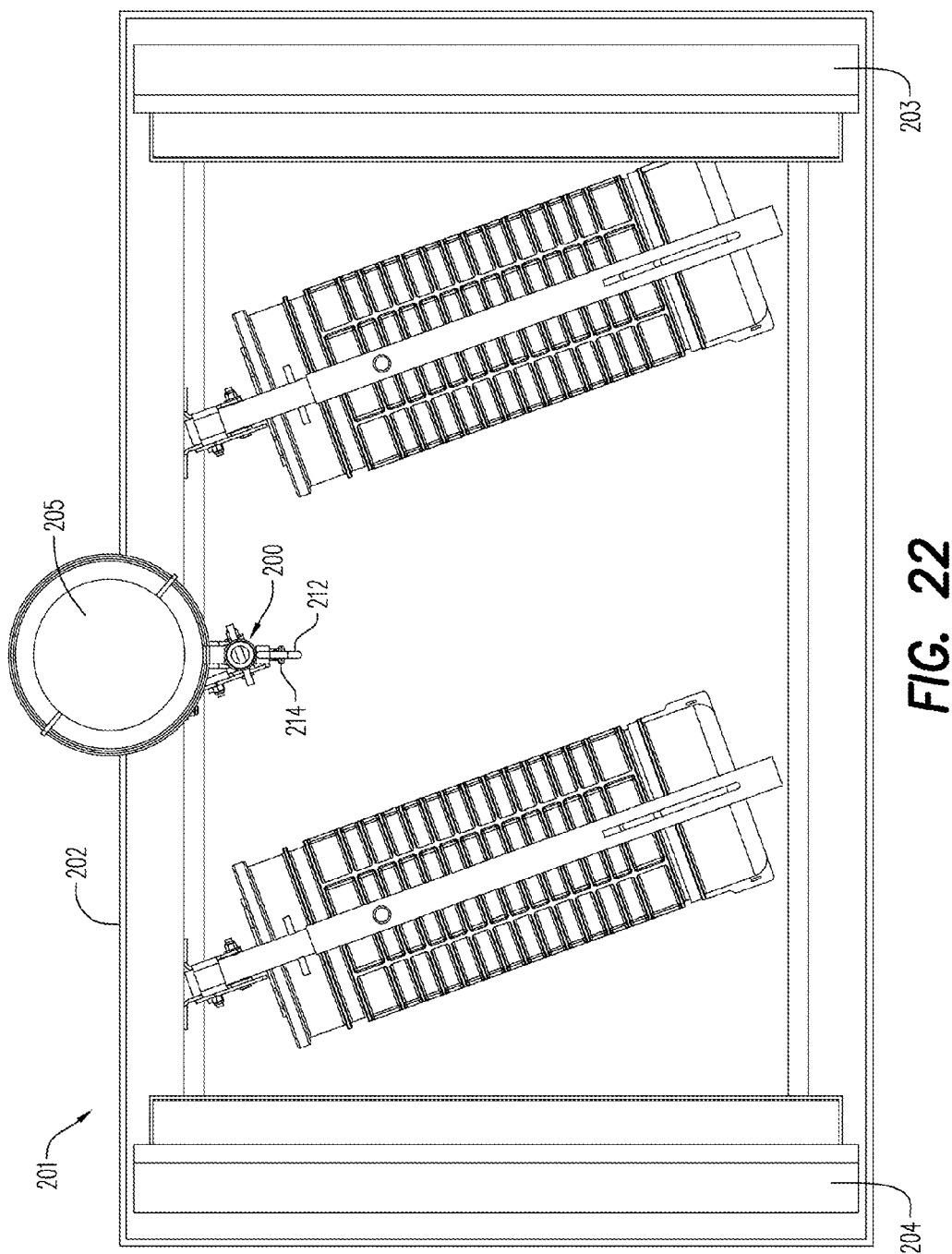
FIG. 22 is a top plan view of a representative vault system having three swing arm assemblies each having a mounted enclosure with the three swing arm assemblies mounted to a vault and with one of the swing arm assemblies in a third open position according to an illustrative embodiment of the present application.

Referring to FIG. 22, a top plan view of a representative vault system 201 having a swing arm assembly 200 (three shown) each having a mounted enclosure 205 with the three swing arm assemblies mounted to a vault 202 and with one of the swing arm assemblies in a third open position according to an illustrative embodiment of the present application is shown. The vault 202 in this illustrative embodiment includes two doors 203, 204 that are shown in the open position. As can be appreciated, the third open position provides some greater access to the wiring enclosure 205, at a height and orientation that might be more convenient for a technician than that shown in FIG. 19, here at a 180 degree turn. Additionally, a biased, preferably spring loaded plunger 214 is shown engaged into a slot and/or hole in inner tube 220 (not shown) in order to lock the outer tube 210 in the third open position. The slot in inner tube 220 permits rotation from the second open position to at least a third open position and the hole in the slot (not shown) allows the wiring enclosure 205 to temporarily lock the swing arm assembly 200 into the third open position. In order to change the position, the technician would pull spring loaded plunger 214. In order to change the position of the wiring enclosure 205 to the closed position, the technician would rotate back 180 degrees and release the latch (not shown) in order to lower the wiring enclosure 205.

Figure 23:
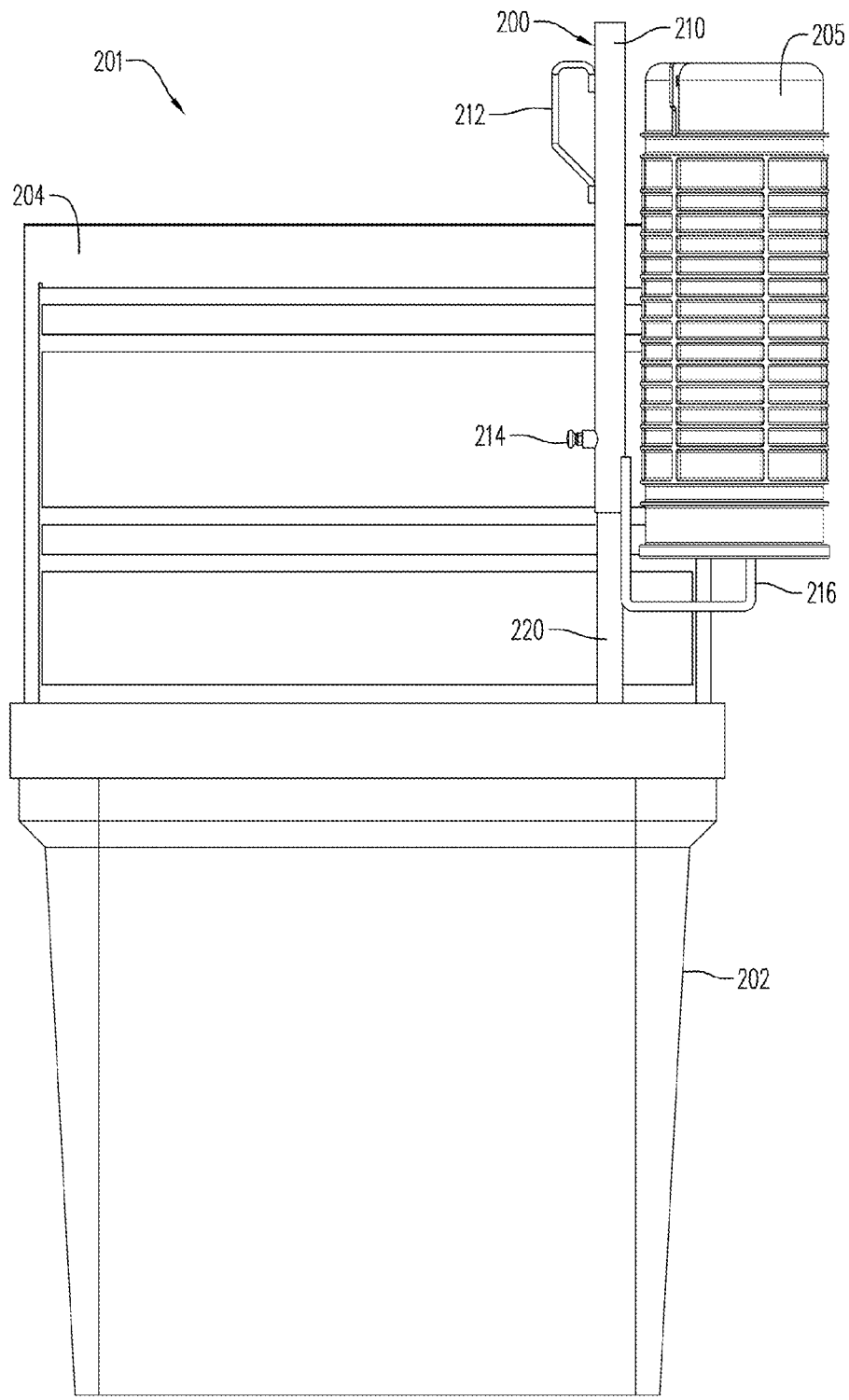
FIG. 23 is a side perspective view of a representative vault system having three swing arm assemblies each having a mounted enclosure with the three swing arm assemblies mounted to a vault and with one of the swing arm assemblies in a third open position according to an illustrative embodiment of the present application.

Referring to FIG. 23, a side perspective view of a representative vault system 201 having a swing arm assembly 200 (three shown) each having a mounted enclosure 205 with the three swing arm assemblies mounted to a vault 202 and with one of the swing arm assemblies in a third open position according to an illustrative embodiment of the present application is shown. The vault 202 in this illustrative embodiment includes two doors 203, 204 that are shown in the open position. As can be appreciated, the third open position provides some greater access to the wiring enclosure 205, at a height and orientation that might be more convenient for a technician than that shown in FIG. 19. Here, the inner tube 220 is shown because the outer tube 210 is raised thereby exposing the inner tube 220. Here, the orientation may be more convenient because the outer tube 210 no longer blocks convenient access to the wiring enclosure 205 because it has been rotated by approximately 180 degrees. Handle 212 is shown on the inner tube 220. Additionally, the biased, preferably spring loaded plunger 214 is shown engaged into a hole portion of a slot in inner tube 220 (not shown) in order to lock the outer tube 210 in the third open position. The slot in inner tube 220 permits rotation from the second open position to at least a third open position and the hole portion of the slot allows the wiring enclosure 205 to temporarily lock the swing arm assembly 200 into the third open position. In order to change the position, the technician would pull spring loaded plunger 214. In order to change the position of the wiring enclosure 205 to the closed position, the technician would rotate back 180 degrees and release the latch (not shown) in order to lower the wiring enclosure 205. Here, the wiring enclosure 205 is mounted to the outer tube 210 by a mounting bracket 216. In certain embodiments, a locking portion 225 is provided allows the wiring enclosure to be temporarily locked at a desired position.

In another feature of this illustrative embodiment, the swing arm assembly 200 includes a portion connected to an enclosure that is rotatable around an axis such as including the ability to rotate and to be temporarily fixed in a service position and fixed to prevent raising the enclosure to an even higher position including preventing the tubular portion connected to the enclosure from being lifted off of a base telescoping tubular portion. For example, the biased, preferably spring loaded plunger 214 is shown engaged into a slot in inner tube 220 (not shown) in order to allow the outer tube 210 to rotate around an axis at the height of the second open position. This configuration prevents the user from raising the enclosure to an even higher position including preventing the user from lifting the outer tube 210 above and off the inner tube 220.

Figure 24:
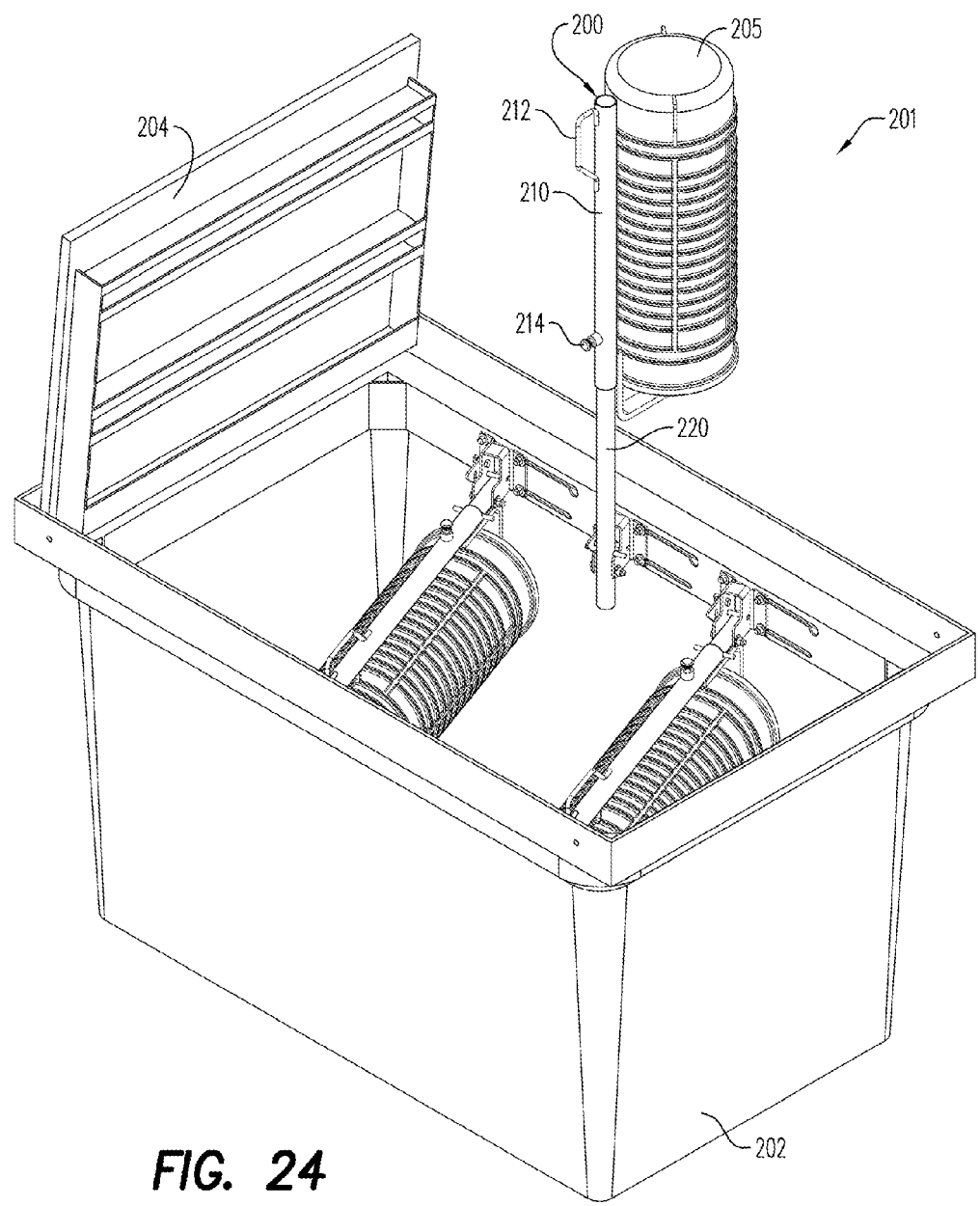
FIG. 24 is a perspective view of a representative vault system having three swing arm assemblies each having a mounted enclosure with the three swing arm assemblies mounted to a vault and with one of the swing arm assemblies in a third open position according to an illustrative embodiment of the present application.

Referring to FIG. 24, a perspective view of a representative vault system 201 having a swing arm assembly 200 (three shown) each having a mounted enclosure 205 with the three swing arm assemblies mounted to a vault 202 and with one of the swing arm assemblies in a third open position according to an illustrative embodiment of the present application is shown. Door 204 is shown open and door 203 is removed (not shown). Here, the inner tube 220 is shown because the outer tube 210 is raised. Handle 212 is shown on the outer tube 210. Additionally, the biased, preferably spring loaded plunger 214 is shown.

Figure 25:
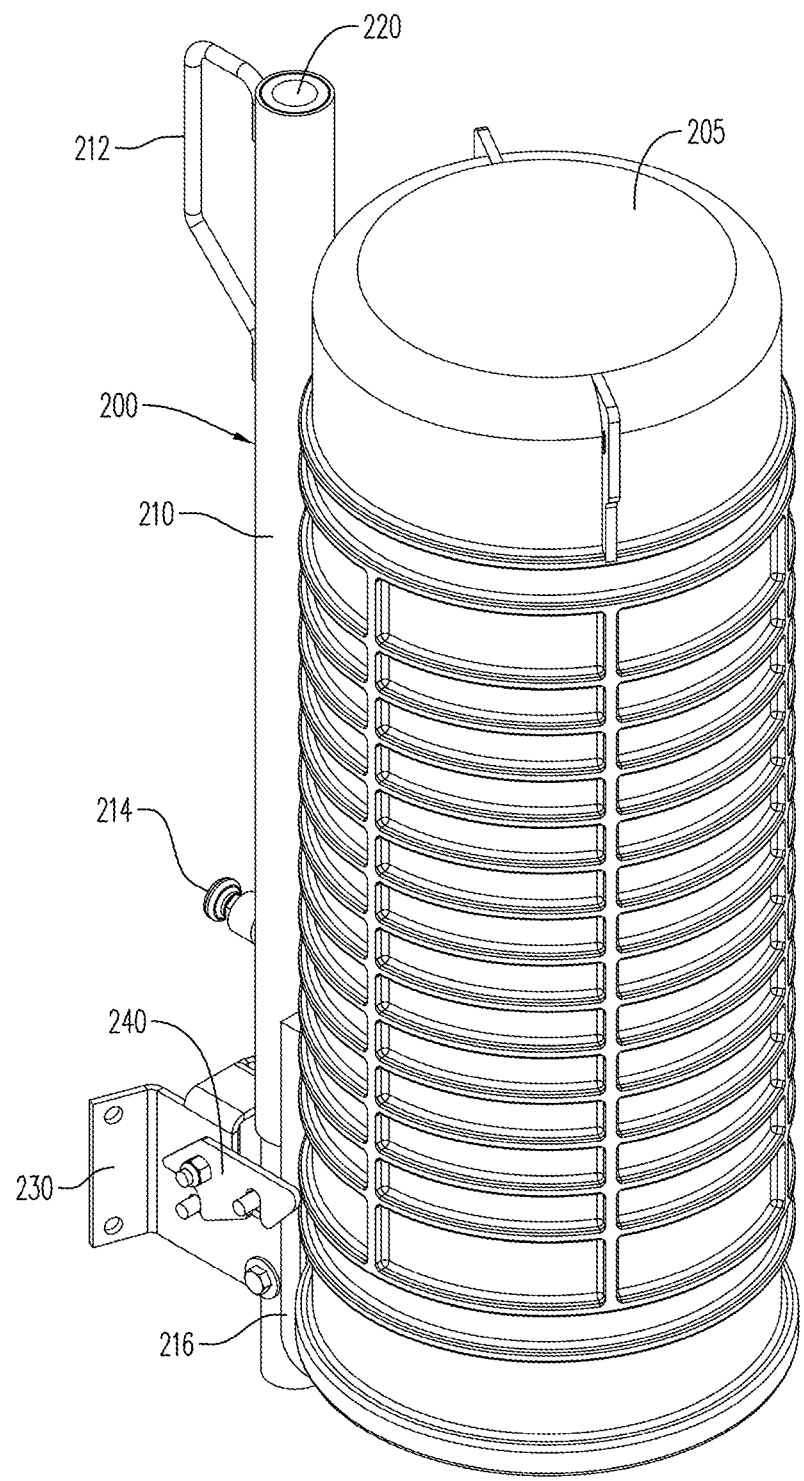
FIG. 25 is a side perspective view of a swing arm assembly having a mounted enclosure with the swing arm assembly in a first open position according to an illustrative embodiment of the present application.

Referring to FIG. 25, a side perspective view of a swing arm assembly 200 having a mounted enclosure 205 with the swing arm assembly in a first open position according to an illustrative embodiment of the present application is shown. Here, the inner tube 220 is shown because it protrudes slightly through the top of the outer tube 210. Handle 212 is shown on the outer tube 210. Additionally, the biased, preferably spring loaded plunger 214 is shown. If a lower locking position is desired, a lower slot in inner tube 220 (not shown) would be provided for engaging the spring loaded plunger in the first open position. If it is desired that the outer tube 210 not rotate in that position, then the slot would instead be a hole slightly larger than the plunger distal end (not shown). Here, mounting bracket 230 is shown with latch 240 in the locked position. Additionally, the wiring enclosure 205 is shown connected to the outer tube 210 using mounting bracket 216.

Figure 26:
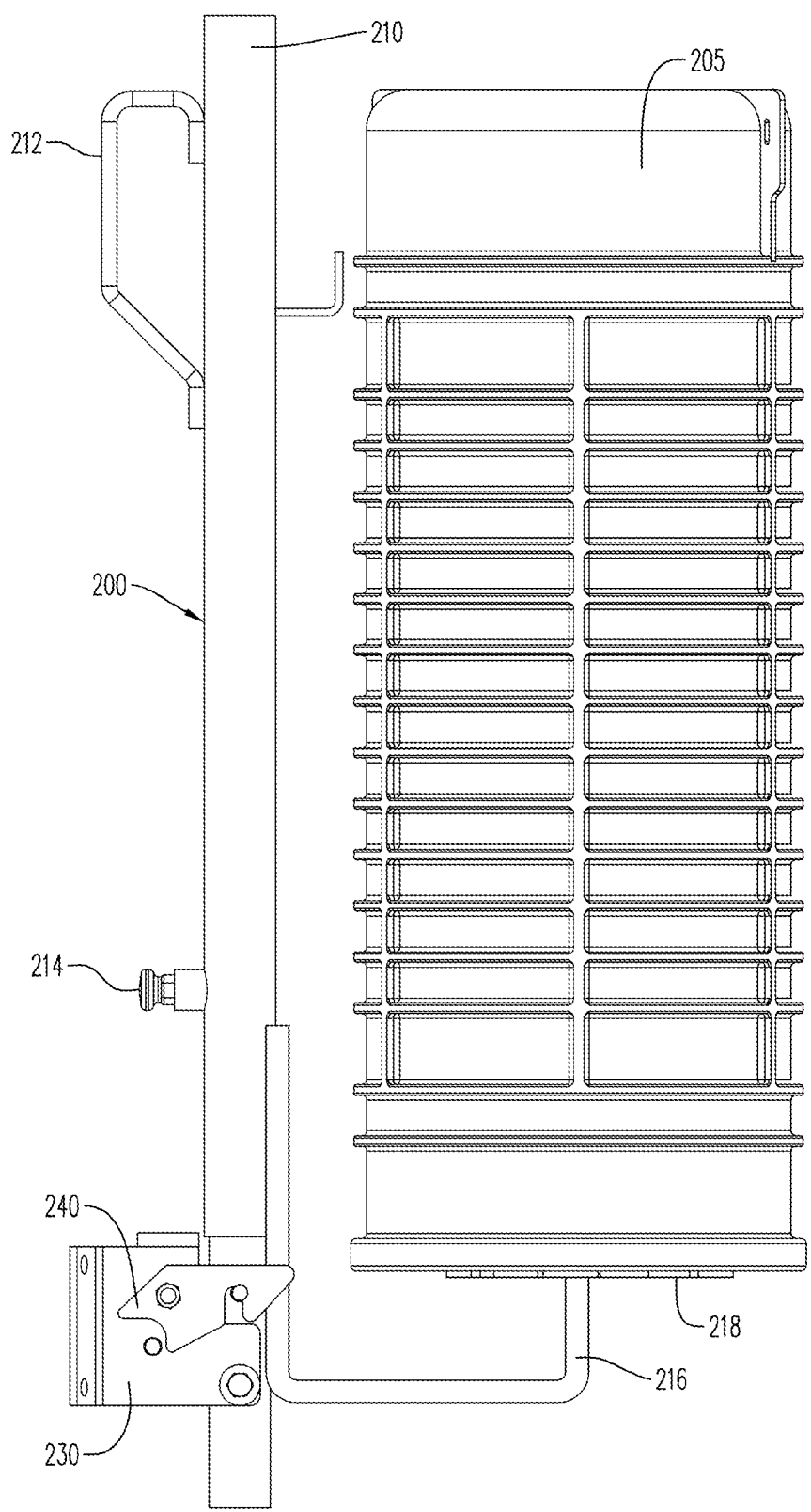
FIG. 26 is a side plan view of a swing arm assembly having a mounted enclosure with the swing arm assembly in a first open position according to an illustrative embodiment of the present application.

Referring to FIG. 26, a side plan view of a swing arm assembly 200 having a mounted enclosure 205 with the swing arm assembly in a first open position according to an illustrative embodiment of the present application is shown. Here, the inner tube 220 is shown at the lower latching portion. Handle 212 is shown on the outer tube 210. Additionally, the biased, preferably spring loaded plunger 214 is shown engaged in a slot in inner tube 220 (not shown). Here, mounting bracket 230 is shown with latch 240 in the locked position. Additionally, the wiring enclosure 205 is shown connected to the outer tube 210 using mounting bracket 216 attached to a mounting portion 218 of the wiring enclosure 205.

Figure 27:
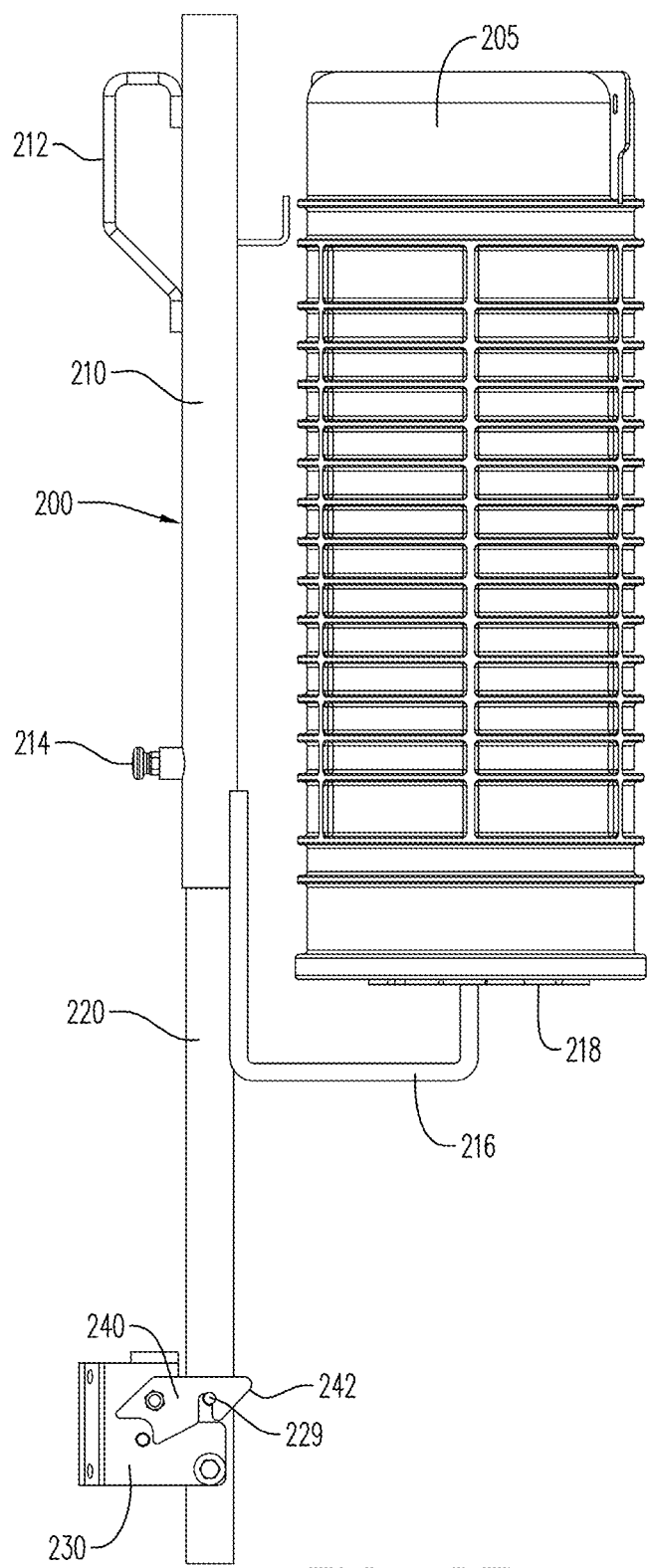
FIG. 27 is a side plan view of a swing arm assembly having a mounted enclosure with the swing arm assembly in a second open position according to an illustrative embodiment of the present application.

Referring to FIG. 27, a side plan view of a swing arm assembly 200 having a mounted enclosure 205 with the swing arm assembly in a second open position according to an illustrative embodiment of the present application is shown. Here, the inner tube 220 is shown because the outer tube 210 has been lifted up and away. Handle 212 is shown on the outer tube 210. Additionally, the biased, preferably spring loaded plunger 214 is shown engaged in a slot in inner tube 220 (not shown). Here, mounting bracket 230 is shown with latch 240 in the locked position. The latch 240 includes a cam surface 242 that engages the latch pin 229 automatically without requiring that a technician lift the latch 240. Additionally, the wiring enclosure 205 is shown connected to the outer tube 210 using mounting bracket 216 attached to a mounting portion 218 of the wiring enclosure 205.

Figure 28:
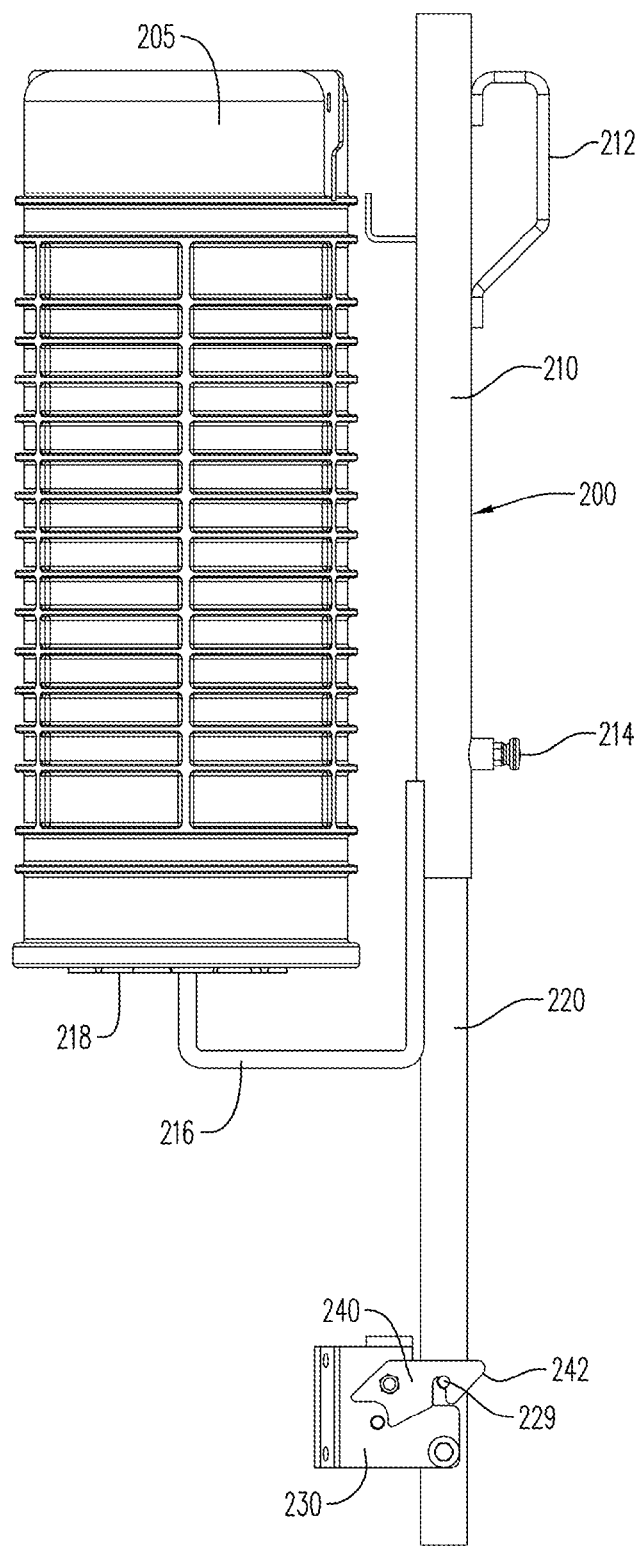
FIG. 28 is a side plan view of a swing arm assembly having a mounted enclosure with the swing arm assembly in a third open position according to an illustrative embodiment of the present application.

Referring to FIG. 28, a side plan view of a swing arm assembly 200 having a mounted enclosure 205 with the swing arm assembly in a third open position according to an illustrative embodiment of the present application is shown. Here, the inner tube 220 is shown because the outer tube 210 has been lifted up and away and rotated approximately 180 degrees. Handle 212 is shown on the outer tube 210. Additionally, the biased, preferably spring loaded plunger 214 is shown engaged in a slot and its locking hole in inner tube 220 (not shown). Here, mounting bracket 230 is shown with latch 240 in the locked position. The latch 240 includes a cam surface 242 that engages the latch pin 229 automatically without requiring that a technician lift the latch 240. Additionally, the wiring enclosure 205 is shown connected to the outer tube 210 using mounting bracket 216 attached to a mounting portion 218 of the wiring enclosure 205. The universal mounting plate 218 or adapter is adapted to receive interchangeably at least two different types of wiring enclosures.

Figure 29:
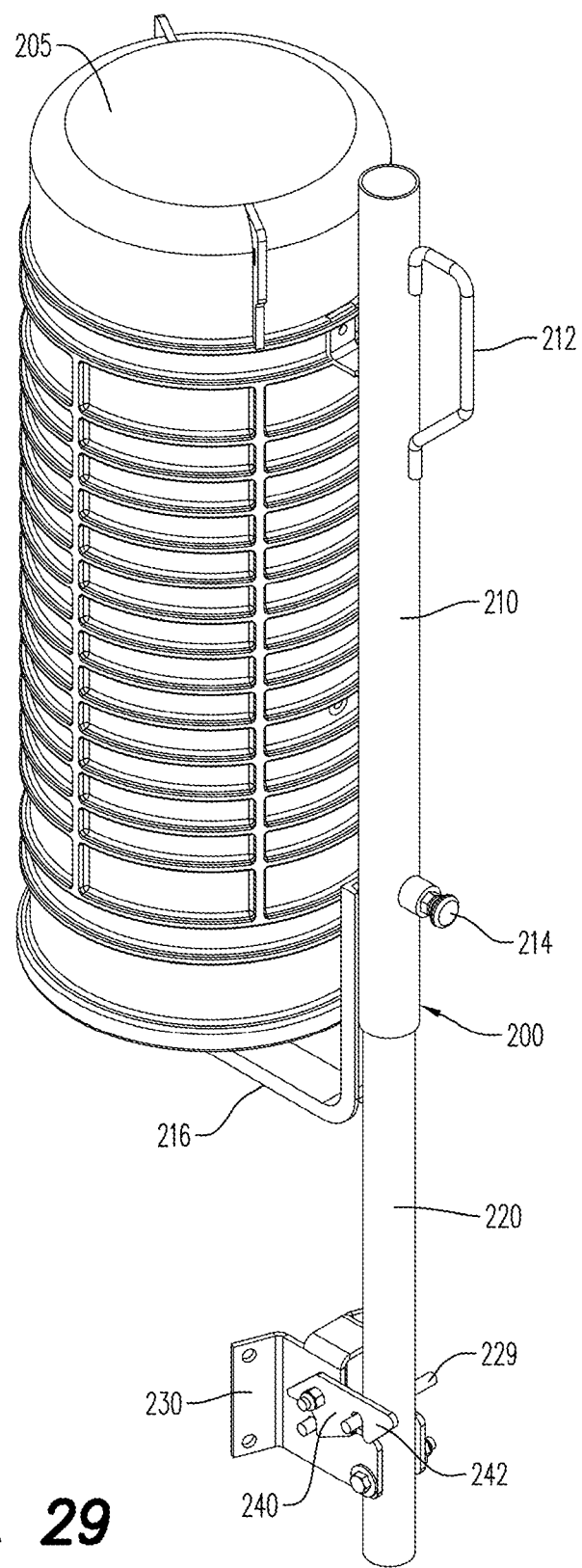
FIG. 29 is a side perspective view of a swing arm assembly having a mounted enclosure with the swing arm assembly in a third open position according to an illustrative embodiment of the present application.

Referring to FIG. 29, a side perspective view of a swing arm assembly 200 having a mounted enclosure 205 with the swing arm assembly 200 in a third open position according to an illustrative embodiment of the present application is shown. Here, the inner tube 220 is shown with latch pin 229 installed. The slot 224 that engages biased plunger 214 is not shown. Handle 212 is shown on the outer tube 210 and spring loaded plunger 214 is shown. Outer tube 210 is connected to wiring enclosure mounting bracket 216 that is connected to universal wiring enclosure mounting plate (not shown). Here, mounting bracket 230 is shown locked. The latch 240 includes a cam surface 242 that engages the latch pin 229 automatically without requiring that a technician lift the latch 240.

Figure 30:
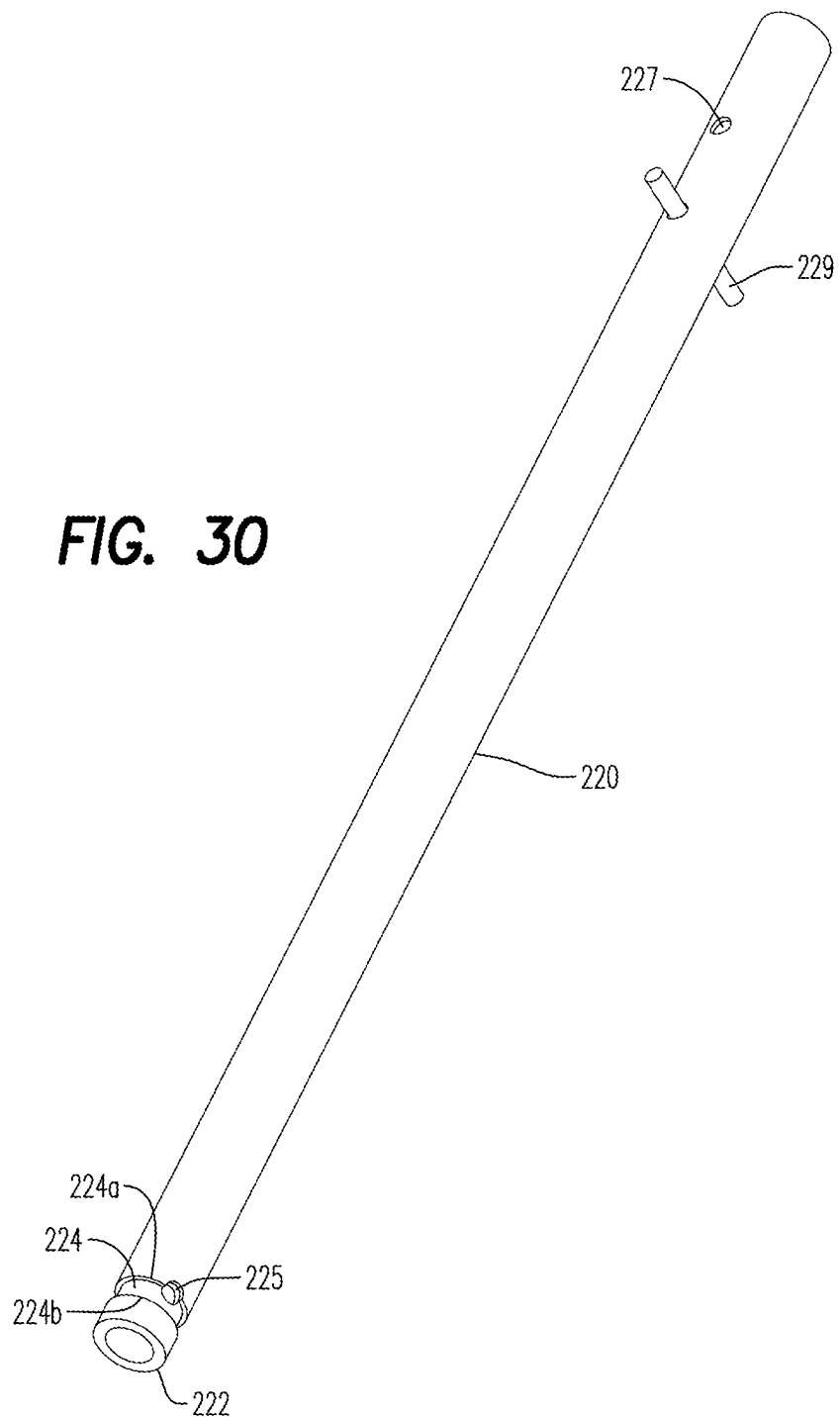
FIG. 30 is a perspective view of an inner tube for a swing arm assembly according to an illustrative embodiment of the present application.

Referring to FIG. 30, a perspective view of an inner tube 220 for a swing arm assembly according to an illustrative embodiment of the present application is shown. The inner tube 220 includes an upper slot 224 for allowing an outer tube to rotate 180 or more degrees including 360 degrees.

As discussed above with respect to slot 124 of FIGS. 1 through 15*c*, the slot 124 is defined through inner tube 120 and thus, its length and the degree of rotation is therefore limited by the need for remaining portion 125 of the inner tube shown in FIG. 15*c*. In contrast, slot 224 lacks any remaining portion and, thus, allows rotation of up to 360 degrees. Thus, slot 224 is configured to allow 360 degrees of rotation.

In some embodiments, slot 224 can be formed as a recess in the outer diameter of inner tube 220. In other embodiments, slot 224 is formed by inner tube 220 having an upper edge that defines one side 224*a* of slot 224. This embodiment further includes a cap 222 that is secured in an inner diameter of inner tube 220. Here, cap 222 forms a second side 224*b* of the slot.

In an alternative, a stop (not shown) is provided to permit 359 degrees of rotation. Here, a locking portion 225 is used to capture a spring loaded plunger 214 to temporarily fix the outer tube 210 at a rotation such as 180 degrees. The locking portion 225 and slot 224 also provide a measure of protection to prevent the outer tube from being lifted off the inner tube. Plunger 214 is shown installed in the side view. Hole 227 is also shown in inner tube 220.

In embodiments where slot 224 is a recess defined in the outer diameter of inner tube 220, locking portion 225 can be a recess defined in a longitudinal direction, where the recess crosses side 224*a* of slot 224 and has a dimension sufficient to receive plunger 214. Alternately, locking portion 225 can be a hole through inner tube 220, where the hole crosses side 224*a* of slot 224 and has a dimension sufficient to receive plunger 214.

In embodiments where slot 224 is formed by inner tube 220 and cap 222, locking portion 225 can be a hole through both inner tube 220 and cap 222, where the hole crosses side 224*a* of slot 224 and has a dimension sufficient to receive plunger 214.

In any of the illustrative embodiments described herein, an insert on the end of an inner tube that allows for 360 degrees of rotation may be used. Here, the insert may be a slot milled, cut or otherwise formed in the tube or in an insert or attachment to the inner tube. Additionally, the insert optionally includes a hole that locks the swing arm once rotated out of the vault enclosure. Here, the hole may be drilled or otherwise formed in the tube or in an insert or attachment to the inner tube. In yet another alternative to any of the embodiments, one, two, three, four or more swing arm assemblies may be utilized in a vault. In yet another alternative, the mounting bracket(s) used may be formed to include a 20 degree mounting angle relative to the respective vault enclosure side wall to which it is mounted. The angle may alternatively be between 10 and 30 degrees or 15 to 25 degrees. Such a mounting bracket may provide an increased bend radius for media entering the enclosures such as providing an increased bend radius for fiber optic cable or any other cable that would benefit from an increased bend radius.

In any of the illustrative embodiments described herein, one or more of the parts or components may be constructed of mild steel. Similarly, the mild steel may be galvanized. In one preferred embodiment, the parts are galvanized mild steel. In an alternative, one or more or all of the parts may be made from any one of the following materials or a similar material as appropriate including: plastic, stainless steel, other iron alloys, aluminum or its alloys, plastic, powder coated metal and/or metal plated with chrome or other plating. The vault may be made o any appropriate material listed herein and may also include concrete or stone or the like and may be waterproofed.

The swing arm assembly may be mounted to the vault using screws, bolts or other fastener. The operator of a completed and installed unit may lift handle 212 until latch 240 catches and then while still holding the handle 212 may lift the outer tube 210 and twist until plunger 214 engages slot 224 and locking portion 226 of the slot to temporarily fix the wiring enclosure 10 in a third open position. To close, the operator lifts up on handle 212, rotates in the opposite direction and lowers into the first open position. The latch 240 is then manually released and the wiring enclosure 10 lowered into the closed position.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the disclosure is not to be considered as limited by the foregoing description.

What is claimed is:

1. A swing arm assembly comprising:
   a mounting bracket mountable on a vault enclosure side wall, the mounting bracket being configured to form a mounting angle relative to a line perpendicular to the vault enclosure side wall of from 10 and 30 degrees;
   an inner tube connected to the mounting bracket for pivoting movement between a closed position and a lower position; and
   an outer tube positioned over the inner tube for telescoping movement between the lower position and an upper position.

2. The swing arm assembly of claim 1, wherein the outer tube is further positioned over the inner tube so that the outer tube has a rotational movement between the upper position and a service position.

3. The swing arm assembly of claim 2, further comprising a wiring enclosure mounted to the outer tube.

4. The swing arm assembly of claim 2, further comprising a plunger biased through the outer tube towards the inner tube and a slot in the inner tube remote from the mounting bracket, the plunger having a distal end that is received in the slot when the outer tube is telescopically moved with respect to the inner tube to the upper position to secure the outer tube in the upper position, the distal end sliding in the slot when the outer tube is rotationally moved with respect to the inner tube between the upper and service positions.

5. The swing arm assembly of claim 4, wherein the slot is configured to allow 360 degrees of rotation.

6. The swing arm assembly of claim 1, wherein the inner tube has a slot remote from the mounting bracket.

7. The swing arm assembly of claim 6, wherein the slot further comprises a locking portion running in a longitudinal direction at the service position, the distal end being received in the locking portion to secure the outer tube in the service position.

8. The swing arm assembly of claim 6, wherein the slot is formed through the inner tube and has a remaining portion of the inner tube.

9. The swing arm assembly of claim 6, wherein the slot has a length in a circumferential direction that allows for rotational movement of up to 180 degrees.

10. The swing arm assembly of claim 6, wherein the slot comprises a recess defined in an outer diameter of the inner tube.

11. The swing arm assembly of claim 6, wherein the slot comprises a first side defined by an upper edge of the inner tube and a second side defined by a cap secured in an inner diameter of the inner tube.

12. The swing arm assembly of claim 1, wherein the mounting bracket further comprises a latch to releasably secure the inner tube in the lower position.

13. A vault assembly comprising:
    a utility vault for receipt of telecommunication cables;
    a mounting bracket mounted on a wall of the utility vault;
    an inner tube connected to the mounting bracket for pivoting movement between a closed position and a lower position, the mounting bracket forming a mounting angle relative to a line perpendicular to the wall of from 10 and 30 degrees; and
    an outer tube positioned over the inner tube for telescoping movement between the lower position and an upper position and for rotational movement from the upper position to a service position.

14. The vault assembly of claim 13, further comprising a wiring enclosure mounted to the outer tube, the wiring enclosure being configured to receive the telecommunication cables.

15. The vault assembly of claim 13, further comprising a plunger biased through the outer tube towards the inner tube and a slot in the inner tube remote from the mounting bracket, the plunger having a distal end that is received in the slot when the outer tube is telescopically moved with respect to the inner tube to the upper position to secure the outer tube in the upper position, the distal end sliding in the slot when the outer tube is rotationally moved with respect to the inner tube between the upper and service positions.

16. The vault assembly of claim 13, wherein the slot is configured to allow 360 degrees of rotation.

* * * * *